US006847029B2

(12) United States Patent
Hill

(10) Patent No.: US 6,847,029 B2
(45) Date of Patent: Jan. 25, 2005

(54) MULTIPLE-SOURCE ARRAYS WITH OPTICAL TRANSMISSION ENHANCED BY RESONANT CAVITIES

(75) Inventor: Henry A. Hill, Tucson, AZ (US)

(73) Assignee: Zetetic Institute, Tucson, AZ (US)

(*) Notice: Subject to any disclaimer, the term of this patent is extended or adjusted under 35 U.S.C. 154(b) by 0 days.

(21) Appl. No.: 09/917,400

(22) Filed: Jul. 27, 2001

(65) Prior Publication Data

US 2002/0148955 A1 Oct. 17, 2002

Related U.S. Application Data

(60) Provisional application No. 60/221,091, filed on Jul. 27, 2000.

(51) Int. Cl.[7] ................................................. H01S 3/08

(52) U.S. Cl. ..................................... 250/216; 372/103

(58) Field of Search ................................. 356/512, 477, 356/480, 516; 250/552, 216, 201.3; 372/92–108

(56) References Cited

U.S. PATENT DOCUMENTS

| | | | | |
|---|---|---|---|---|
| 4,340,306 A | * | 7/1982 | Balasubramanian | 356/513 |
| 4,390,994 A | * | 6/1983 | Roberts et al. | 372/99 |
| 4,592,058 A | * | 5/1986 | Mongeon et al. | 372/32 |

(List continued on next page.)

FOREIGN PATENT DOCUMENTS

| | | |
|---|---|---|
| EP | 0 409 468 A2 | 1/1991 |
| EP | 0 757 271 A2 | 2/1997 |
| EP | 0 944 049 A2 | 9/1999 |
| JP | 5-73980 | 5/1993 |
| JP | 5-174410 | 5/1993 |
| WO | WO99/63300 | 12/1999 |

OTHER PUBLICATIONS

Guerra, "Photon–Tunneling Microscopy," *Applied Optics*, 29:26:3741–3752, Sep. 10, 1990.

Bauer et al., "Magnetic Domain Imaging with a Scanning Near–Field Optical Microscope Using a Modified Sagnac Interferometer," *Journal of Microscopy*, 194:2/3:507–511, May/Jun. 1999.

Courjon et al., "New Optical Near Field Developments: Some Perspectives in Interferometry," *Ultramicroscopy*, 61:117–125, 1995.

Pilevar et al., "Reflection Near–field Scanning Optical Microscopy: an Interferometric Approach," *Ultramicroscopy*, 61:233–236, 1995.

Pohl et al., "Near–field Optics: Light for the World of NANO," *J. Vac. Sci. Technol. B*, 12:3:1441–1446, May/Jun. 1994.

Vaez–Iravani et al., "Phase Contrast and Amplitude Pseudoheterodyne Interference Near Field Scanning Optical Microscopy," *Appl. Phys. Lett.* 62:10:1044–1046, Mar. 8, 1993.

Fischer, "Optical Characteristics of 0.1 $\mu$m Circular Apertures in a Metal Film as Light Sources for Scanning Ultramicroscopy," *J. Vac. Sci Technol. B* 3:1:386–390, Jan./Feb. 1985.

(List continued on next page.)

*Primary Examiner*—Thanh X. Luu
*Assistant Examiner*—Stephen Yam
(74) *Attorney, Agent, or Firm*—Fish & Richardson P.C.

(57) ABSTRACT

A multiple source array for illuminating an object including: a reflective mask having an array of spatially separated apertures; at least one optic positioned relative to the mask to form an optical cavity with the mask; and a source providing electromagnetic radiation to the optical cavity to resonantly excite a mode supported by the optical cavity, wherein during operation a portion of the electromagnetic radiation built-up in the cavity leaks through the mask apertures towards the object.

46 Claims, 18 Drawing Sheets

U.S. PATENT DOCUMENTS

| | | | |
|---|---|---|---|
| 4,659,429 A | * | 4/1987 | Isaacson et al. ............... 216/24 |
| 4,681,451 A | | 7/1987 | Guerra et al. |
| 5,004,307 A | | 4/1991 | Kino et al. |
| 5,105,403 A | | 4/1992 | Kando et al. |
| 5,105,408 A | | 4/1992 | Lee et al. |
| 5,121,256 A | | 6/1992 | Corle et al. |
| 5,125,750 A | | 6/1992 | Corle et al. |
| 5,150,338 A | | 9/1992 | Birecki et al. |
| 5,214,630 A | | 5/1993 | Goto et al. |
| 5,223,693 A | * | 6/1993 | Zumoto et al. ......... 219/121.68 |
| 5,327,223 A | * | 7/1994 | Korth .......................... 356/511 |
| 5,349,443 A | | 9/1994 | Guerra |
| 5,371,588 A | | 12/1994 | Davis et al. |
| 5,442,443 A | | 8/1995 | Guerra |
| 5,497,359 A | | 3/1996 | Mamin et al. |
| 5,602,643 A | | 2/1997 | Barrett |
| 5,602,819 A | | 2/1997 | Inagaki et al. |
| 5,602,820 A | | 2/1997 | Wickramasinghe et al. |
| 5,666,197 A | | 9/1997 | Guerra |
| 5,689,480 A | | 11/1997 | Kino |
| 5,739,527 A | | 4/1998 | Hecht et al. |
| 5,760,901 A | | 6/1998 | Hill |
| 5,784,400 A | * | 7/1998 | Joannopoulos et al. ....... 372/96 |
| 5,789,734 A | | 8/1998 | Torigoe et al. |
| 5,796,487 A | | 8/1998 | Guerra |
| 5,834,767 A | | 11/1998 | Hasegawa et al. |
| 5,883,872 A | | 3/1999 | Kino |
| 5,973,316 A | * | 10/1999 | Ebbesen et al. ............. 250/216 |
| 6,201,820 B1 | * | 3/2001 | Palmer ........................ 372/32 |
| 6,248,988 B1 | * | 6/2001 | Krantz .................... 250/201.3 |
| 6,528,780 B1 | * | 3/2003 | Mitsuoka et al. ........... 250/216 |
| 6,580,677 B1 | * | 6/2003 | Chiba et al. ................. 369/126 |

OTHER PUBLICATIONS

Fischer et al., "Near–Field Optical ScanningMicroscopy and Enhanced Spectroscopy with Submicron Apertures," *Scanning Microscopy Supplement*, 1:47–52, 1987.

Durig et al., "Near–Field Optical Scanning Microscopy," *J. Appl. Phys.* 59:10:3318–3327, May 15, 1986.

Meixner et. al., "Direct Measurement of Standing Evanescent Waves with a Photon–Scanning Tunneling Microscope," *Applied Optics*, 33:34:7995–8000, Dec. 1, 1994.

Bainier et al., "Evanescent Interferometry by Scanning Optical Tunneling Detection," *J.Opt.Soc.Am.A*, 13:2:267–275, Feb. 1996.

* cited by examiner

MULTIPLE-SOURCE ARRAYS WITH OPTICAL TRANSMISSION ENHANCED BY RESONANT CAVITIES

CROSS-REFERENCE TO RELATED APPLICATIONS

This application claims priority from provisional application Ser. No. 60/221,091 filed Jul. 27, 2000 by Henry A. Hill entitled "Multiple-Source Arrays with Optical Transmission Enhanced by Resonant Cavities," the contents of which is incorporated herein by reference.

BACKGROUND OF THE INVENTION

Efficient, controlled conveyance of optical energy through apertures in otherwise opaque materials is an important aspect of many optical measurement instruments. This observation is especially applicable to near-field microscopy, which employs apertures smaller than a free space optical wavelength of an optical beam used in the near-field microscopy, hereinafter referred to as sub-wavelength apertures, to achieve imaging with high spatial resolution. The low optical efficiency, typically of the order $10^{-4}$ or lower, of sub-wavelength probes used as near-field scanning probes can have a negative impact on signal-to-noise ratios and measurement bandwidth.

SUMMARY OF THE INVENTION

The invention features systems and methods for near-field, interferometric microscopy and interferometric, confocal microscopy in which a resonant optical cavity is formed adjacent an aperture or array of apertures to enhance transmission of a probe beam, e.g., a near-field probe beam, through the aperture or array of apertures. The apertures may be used in either reflective or transmissive microscopy systems. Furthermore, the microscopy systems using the aperture or array of apertures may be designed to investigate the profile of a sample, to read optical date from a sample, and/or write optical date to a sample.

In general, in one aspect, the invention features a multiple source array for illuminating an object. The multiple source array includes: a reflective mask having an array of spatially separated apertures; at least one optic positioned relative to the mask to form an optical cavity with the mask; and a source providing electromagnetic radiation to the optical cavity to resonantly excite a mode supported by the optical cavity. During operation a portion of the electromagnetic radiation built-up in the cavity leaks through the mask apertures towards the object. Typically, the optical cavity is designed to be stable for resonantly excited mode.

Embodiments of the multiple source array may include any of the following features.

The excited mode may have transverse dimensions at the reflective mask that are substantially larger than a transverse dimension of each aperture. For example, the transverse dimensions of the excited mode at the reflective mask may be more than 50 times larger, or even more than 500 times larger than the transverse dimension of each aperture.

Each aperture may have a transverse dimension smaller than the vacuum wavelength of the electromagnetic radiation provided by the source.

Each aperture may have a transverse dimension comparable to the vacuum wavelength of the electromagnetic radiation provided by the source.

The apertures may be formed by holes in the reflective mask.

The apertures may be formed by dielectric regions in the reflective mask.

Each aperture may include a dielectric region defining a waveguide having transverse dimensions sufficient to support a propagating mode of the electromagnetic radiation. During operation the waveguides couple the electromagnetic energy built-up in the cavity between opposite sides of the mask. The reflective mask may further include an end mask portion adjacent the object, wherein each aperture further includes a secondary aperture formed in the end mask portion and aligned with the corresponding waveguide. In such cases, each secondary aperture has a transverse dimension smaller than the transverse dimensions of the corresponding waveguide. For example, the transverse dimension of each secondary aperture may be smaller than the vacuum wavelength of the electromagnetic radiation provided by the source. Furthermore, the reflective mask may include a reflective dielectric stack surrounding the waveguides, and the end mask portion may include a metal layer providing the secondary apertures. Furthermore, in some cases, each waveguide defines a second optical cavity between the opposite sides of the mask, and the length of each waveguide is selected to be resonant with the corresponding propagating mode of the electromagnetic radiation.

The reflective mask may include a reflective dielectric stack. Furthermore, the reflective dielectric stack may be adjacent the optical cavity and the reflective mask may further include an antireflection coating adjacent the object.

The multiple source array may further include a dielectric material contacting the mask in the cavity. For example, the dielectric material may include an Amici lens. The optical cavity may be a linear optical cavity. For example, the at least one optic may be one optic (e.g., a mirror or a lens), and the linear optical cavity is formed by two surfaces, the first surface being defined by the optic and the second surface being defined by the interface between the reflective mask and dielectric material. Furthermore, the dielectric material may fill the space between the two surfaces and the first surface is defined by the interface between the optic and the dielectric material.

In other embodiments, the at least one optic may be two optics and the cavity may be a folded cavity formed by three surfaces, the first surface being defined by the first optic, the second surface being defined by the second optic, and the third surface being defined by the interface between the reflective mask and a dielectric material contacting the mask in the cavity. For example, the first and second surfaces may define the end surfaces for the folded optical cavity.

The optical cavity may also be a ring cavity. For example, the at least one optic may include two optics and the ring cavity may be formed by three surfaces, the first surface being defined by the first optic, the second surface being defined by the second optic, and the third surface being defined by the interface between the reflective mask and dielectric material.

The multiple source array may further include an active feedback system for maintaining the resonance between the optical cavity and the electromagnetic radiation provided by the source. For example, the active feedback system may include an electronic controller that causes the source to change the wavelength of the electromagnetic radiation in response to a servo signal derived from a portion of the electromagnetic radiation reflected from the optical cavity. Also, the system may include a dielectric material at least partially filling the optical cavity, and the active feedback system may include a temperature controller coupled to the dielectric material and an electronic controller that causes the temperature controller to change the temperature of the dielectric material in response to a servo signal derived from a portion of the electromagnetic radiation reflected from the optical cavity. Furthermore, the active feedback system may include a transducer coupled to one of the optics that form the optical cavity and an electronic controller that causes the transducer to dither the coupled optic in response to a servo signal derived from a portion of the electromagnetic radiation reflected from the optical cavity.

In another aspect, the invention features a microscopy system for imaging an object. The microscopy system includes: the multiple source array described above; a multi-element photo-detector; and an imaging system positioned to direct a return beam to the multi-element detector, wherein the return beam includes electromagnetic radiation leaked to the object and scattered/reflected back through the apertures. The microscopy system may further include a pinhole array positioned adjacent the photo-detector, wherein each pinhole is aligned with a separate set of one or more detector elements, and wherein the imaging system produces a conjugate image of each aperture on a corresponding pinhole of the pinhole array. In addition, the microscopy system may further include an interferometer which separates the electromagnetic radiation from the source into a measurement beam which is directed to the optical cavity and a reference beam which is directed along a reference beam path and combined with the return beam to interfere at the multi-element photo-detector.

In another aspect, the invention features a microscopy system for imaging an object, the microscopy system including: the multiple source array described above; a multiple detector array including an array of spatially separated apertures; a multi-element photo-detector; and an imaging system positioned to direct a signal beam to the multi-element detector, wherein the signal beam includes electromagnetic radiation leaked to the object and transmitted by the object through the apertures of the detector array. The apertures of the source array may be aligned with the apertures of the detector array. The microscopy system may further include a pinhole array positioned adjacent the photo-detector, wherein each pinhole is aligned with a separate set of one or more detector elements, and wherein the imaging system produces a conjugate image of each aperture of the detector array on a corresponding pinhole of the pinhole array. In addition, the microscopy system may further include: an interferometer which separates the electromagnetic radiation from the source into a measurement beam which is directed to the optical cavity and a reference beam which is directed along a reference beam path and combined with the signal beam to interfere at the multi-element photo-detector.

In general, in another aspect, the invention features a source for illuminating an object. The source includes: a reflective mask having at least one aperture; and at least one optic positioned relative to the mask to form a stable optical cavity with the mask, wherein during operation a portion of electromagnetic energy built-up in the cavity couples through the mask aperture towards the object. The source may further include any of the features described above for the multiple source arrays.

In general, in another aspect, the invention features a method for illuminating an object with multiple sources, the method including: resonantly exciting a mode of a stable optical cavity; and coupling electromagnetic radiation out of the optical cavity towards the object through an array of apertures in one of the optics that define the cavity, wherein transverse dimensions of the excited mode are substantially larger than a transverse dimension of each aperture. The method may further include features corresponding to any of the features described above for the multiple source array.

Confocal and near-field confocal, microscopy systems are also described in the following, commonly-owned applications: Ser. No. 09/631,230 filed Aug. 2, 2000 by Henry A. Hill entitled "Scanning Interferometric Near-Field Confocal Microscopy," and the corresponding PCT Publication WO 01/09662 A2 published Feb. 8, 2001; Provisional Application Ser. No. 60/221,019 filed Jul. 27, 2000 by Henry A. Hill and Kyle B. Ferrio entitled "Multiple-Source Arrays For Confocal And Near-Field Microscopy" and the corresponding Utility application Ser. No. 09/917,402 having the same title filed on Jul. 27, 2001; Provisional Application Ser. No. 60,221,086 filed Jul. 27, 2000 by Henry A. Hill entitled "Scanning Interferometric Near-Field Confocal Microscopy with Background Amplitude Reduction and Compensation" and the corresponding Utility application Ser. No. 09/917,399 having the same title filed on Jul. 27, 2001; Provisional Application Ser. No. 60/221,287 by Henry A. Hill filed Jul. 27, 2000 entitled "Control of Position and Orientation of Sub-Wavelength Aperture Array in Near-field Scanning Microscopy" and the corresponding Utility application Ser. No. 09/917,401 having the same title filed on Jul. 27, 2001; and Provisional Application Ser. No. 60/221,295 by Henry A. Hill filed Jul. 27, 2000 entitled "Differential Interferometric Confocal Near-Field Microscopy" and the corresponding Utility application Ser. No. 09/917,276 having the same title filed on Jul. 27, 2001; the contents of each of the preceding applications being incorporated herein by reference. Aspects and features disclosed in the preceding provisional applications may be incorporated into the embodiments described in the present application.

Embodiments of the invention may include any of the following advantages.

One advantage is enhanced transmission of an optical beam through an array of wavelength and/or sub-wavelength apertures.

Another advantage is the control of the phase of an enhanced transmission of an optical beam through an array of wavelength and/or sub-wavelength apertures.

Another advantage is the control of an enhanced transmission of an optical beam through an array of wavelength and/or sub-wavelength apertures by adjustment of the resonant frequency of an optical cavity for the optical beam using one or more of electro-mechanical transducers, electro-optical phase modulators, and thermal expansion effects.

Another advantage is excitation of an optical mode of transmission through apertures of an array of wavelength and/or sub-wavelength apertures comprising optical waveguides.

Another advantage is the generation of relative phase shifts at high frequencies between a reference beam and an optical beam transmitted through an array of wavelength and/or sub-wavelength apertures with an enhanced transmission.

Another advantage is that a wavelength of a source of a near-field probe beam may be in the ultraviolet, visible, or the infrared. Furthermore, the source may comprise two or more different wavelengths.

Another advantage is an interferometric profiler based on interferometry of near-field beams.

Another advantage is that the interferometric analysis of the near-field signal beam can improve the signal-to-noise of the near-field information, e.g., the complex amplitudes of near-field beams scattered/reflected by a sample.

Another advantage is that the interferometric analysis can reveal changes in the phase or complex amplitude of near-field signal beams as a function of sample location.

Another advantage is that the confocal features of the systems and methods can remove background contributions from the signal of interest.

Another advantage is that the systems and methods can operate in a continuous scan mode with a pulsed input optical beam.

Another advantage is that in embodiments operating in a reflection mode, each mask aperture couples a near-field probe beam to the sample and couples a near-field signal beam toward the detector. Thus, each mask aperture is both a transmitter and receiver for a corresponding near-field beam, thereby improving lateral resolution. As a further result, the directions of propagation of the components of each near-field probe beam that produce a corresponding near-field signal beam at a given volume section of the sample are substantially the same, thereby simplifying an inverse calculation for properties of the sample using the complex amplitude of the near-field signal beam from the interference signal(s).

Another advantage is that the sample can be profiled using substantially low order electric and magnetic multipole near-field sources, e.g., near-field probe beam sources including an electric dipole and two different orthogonal orientations of a magnetic dipole.

Another advantage is that effects of interference terms caused by a background beam scattered and/or reflected from the mask apertures can be compensated. The interference terms can include interference between the background beam and the reference beam, and the background beam and the near-field signal beam.

Another advantage is that statistical errors in measured amplitudes and phases of the near-field signal beams can be substantially the same as statistical errors based on Poisson statistics of the reflected/scattered near-field probe beams. In other words, the measured amplitudes and phases are not significantly degraded by the presence of background signals.

Another advantage is that the sample properties can be analyzed by using multiple wavelengths.

Another advantage is that the separation between the mask and the sample can be varied to measure the radial dependence of the amplitudes and phases of the near-field signal beams.

Another advantage is that the relative lateral position of the mask and the sample can be varied to measure the angular dependence of the amplitudes and phases of the near-field signal beams.

Another advantage is that the spatial resolution of the system is defined primarily by the dimensions of the mask apertures and their distance from the sample, and is only weakly dependent on the optical system imaging the near-field signal beams emerging from the mask apertures onto the detector array.

Another advantage is that the sample scanning may be implemented in a "step and repeat" mode or in a continuous scan mode.

Another advantage is that a source of the near-field probe beam may be a pulsed source, which may be synchronized with the sample scanning.

Another advantage is that by using a mask with an array of apertures, multiple interference terms can be measured substantially simultaneously for a one-dimensional or a two-dimensional array of locations on the sample. Furthermore, background noise in the multiple interference terms are correlated to one another.

Another advantage is that a given state of magnetization at the region of the sample illuminated by the near-field probe beam can be measured based on the polarization rotation of the near-field signal beam.

Another advantage is that the system can be used to write to an optical data storage medium such as a magneto-optical material.

Another advantage is that the system can profile a surface and internal layers near the surface of an object being profiled/imaged without contacting the object.

Another advantage is that either optical heterodyne or homodyne techniques may be used to measure amplitudes and phases of interference terms between the reference beam and the near-field signal beams.

Another advantage is that the complex refractive index of the sample at a location illuminated by the near-field probe beam can be determined from measured arrays of interference data corresponding to the near-field signal beams, wherein the arrays may comprise one or two dimensions corresponding to one and two dimensions of space, a dimension for the spatial separation of the mask and the sample, a dimension for each of wavelength of components of the near-field probe beam source, and a dimension for the multipole characterization of the near-field probe beam.

Another advantage is that multiple layers of optical data stored on and/or in an optical storage medium can be read by measuring interference data for multiple separations between the mask and the sample.

Another advantage is that multiple layers of optical data stored on and/or in an optical storage medium can be read substantially simultaneously by measuring interference data for multiple wavelengths of the near-field probe beam, and/or different polarizations of the near-field probe beam.

Another advantage is that the mask can include sub-wavelength apertures in a sub-wavelength thick conducting layer, wavelength and sub-wavelength Fresnel zone plate(s), microlenses, and/or gratings to alter the properties of the near-field probe beam(s).

Another advantage is that a change in temperature of a site in or on the sample can be detected as a corresponding change in the complex value of the index of refraction.

Other features, aspects, and advantages follow.

BRIEF DESCRIPTION OF THE DRAWINGS

In the drawings, wherein like reference characters denote similar elements throughout the several views.

DETAILED DESCRIPTION OF THE INVENTION

Embodiments of the present invention comprise enhanced transmission of an optical beam through an aperture or arrays of apertures. For near-field applications one or more of the apertures may have a dimension or dimensions less than wavelength of the free-space incident beam, e.g., a sub-wavelength aperture. In other applications, one or more of the apertures may have a dimension or dimensions less than, comparable to, or greater than the wavelength of the free-space incident beam, e.g., wavelength apertures.

The enhanced transmission is achieved by use of optical cavities. The embodiments further comprise scanning interferometric near-field confocal microscopes operating in either a reflection or transmission mode.

While the apparatus of the present invention has application for a wide range of radiation sources, the following description is taken, by way of example, with respect to an optical measuring system in which the incident beam is a beam of electromagnetic radiation, e.g., an optical beam. In further embodiments, for example, the beam incident on the aperture or arrays of apertures can include an acoustic radiation beam, an electron beam, and an atomic beam.

The source of optical beams used by embodiments of the present invention include CW and pulsed sources in different combinations with single and multiple wavelength sources. The optical cavities are used in generation of enhanced transmission through arrays of wavelength and/or sub-wavelength apertures for both near-field probe beams and reference beams.

Also, while the apparatus of the present invention has application for a wide range of imaging systems, the following description is taken, by way of example, with respect to interferometric confocal near-field microscopy measuring systems. Optical cavities as used herein includes, but is not limited to, use in scanning and step-and-repeat interferometric near-field confocal microscopy systems and scanning and step-and-repeat confocal and interferometric confocal microscopy systems.

Figure 1:
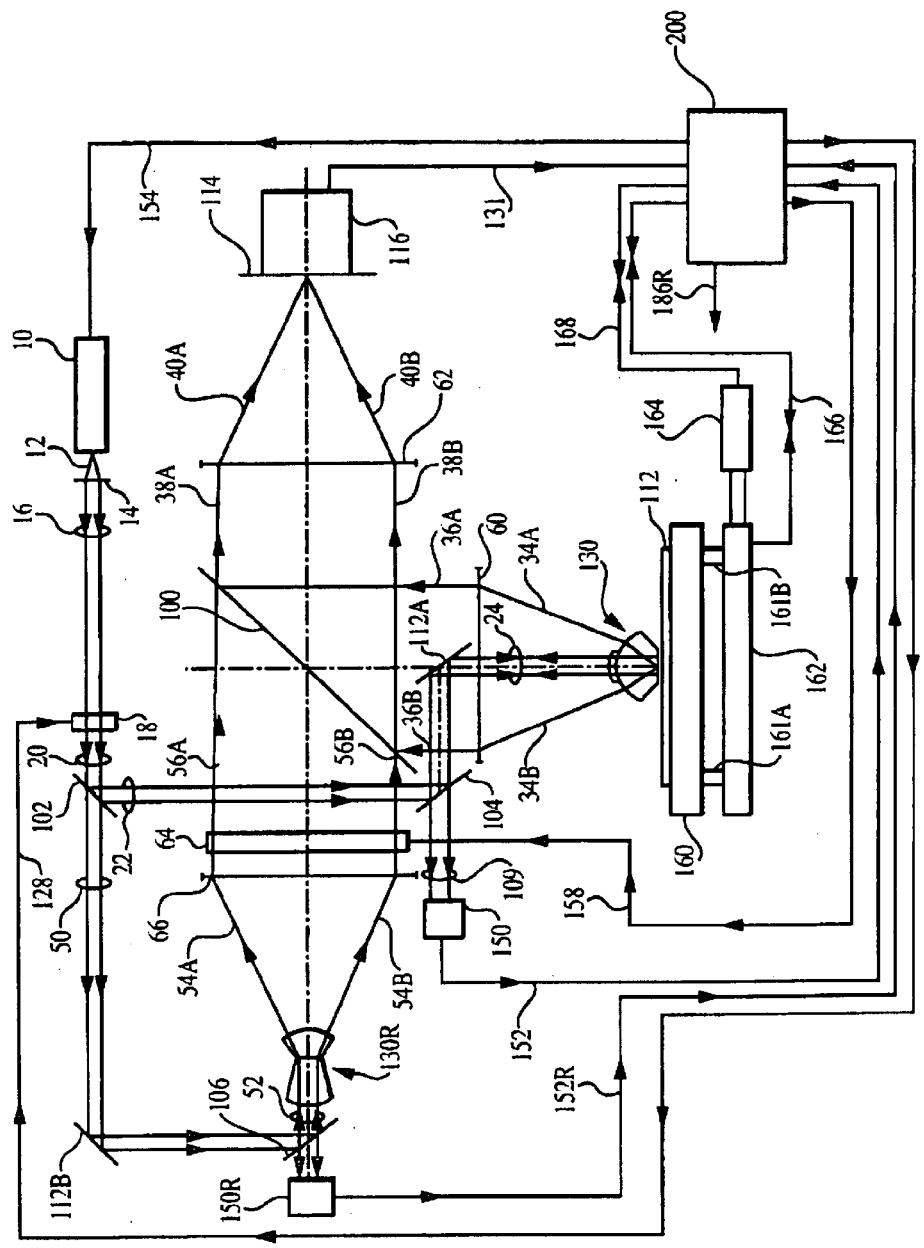
FIG. 1 illustrates, in schematic form, a first embodiment of the present invention.

Referring to the drawings in detail, FIG. 1 depicts in schematic form the first embodiment of the present invention. As shown in FIG. 1, the first embodiment comprises an interferometer, a source 10, object material 112, object material chuck 160, chuck stage 162, translator 164, detector 116, an optical cavity generally indicated at element number 130, and reference object 130R. The configuration of the interferometer is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1 without departing from the spirit and scope of the present invention. Other forms of scanning interferometric near-field confocal microscopes, such as those described in the previously mentioned, commonly owed provisional applications incorporated herein by reference, may be incorporated into apparatus of FIG. 1 without departing from the spirit and scope of the present invention.

Light source 10 such as a laser can be any of a variety of lasers. For example, the laser can be a gas laser, e.g., a HeNe laser, stabilized in any of a variety of conventional techniques known to those skilled in the art, see for example, T. Baer et al., "Frequency Stabilization of a 0.633 $\mu m$ He—Ne-longitudinal Zeeman Laser," *Applied Optics,* 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters,* 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics, QE*-19, 1514–1519 (1983).

For certain of the embodiments disclosed herein, light sources corresponding light source 10 may also be a pulsed source. There are several different procedures for producing a pulsed source [see Chapter 11 entitled "Lasers", *Handbook of Optics,* 1, 1995 (McGraw-Hill, New York) by W. Silfvast]. There may be a restriction on the pulse width. For example, the pulse width may be based on a consideration of the spatial resolution required for a scanning end-use application and/or enhancement properties of the first embodiment as subsequently described.

For the first embodiment, light source 10 is preferably a monochromatic point source or a spatially incoherent source of radiation across surface of the source, preferably a laser or like source of coherent or partially coherent radiation, and preferably polarized. Light source 10 emits input beam 12. As shown in FIG. 1, input beam 12 enters collimating lens 14 to form input beam 16. Input beam 16 is transmitted by a phase retardation plate 18 as input beam 20. The plane of polarization of input beam 20 is rotated by phase retardation plate 18 to be either parallel or orthogonal to the plane of FIG. 1. However, other orientations of the plane of polarization of input beam 20 may be beneficially used in certain end-use applications. The function of phase retardation plate 18 is controlled by signal 128 from electronic controller, signal processor, and computer 200.

The specific device used for the source of beam 12 will determine the diameter and divergence of beam 12. For some sources, e.g., a diode laser, it may be necessary to use conventional beam shaping optics, e.g., a conventional microscope objective and/or anamorphic prisms, to provide beam 12 with a suitable diameter and divergence for elements that follow. When the source is a HeNe laser, for example, beam shaping optics may not be required.

Beam 16 is shown in FIG. 1 as a collimated beam but may be a diverging or a converging beam depending on requirements of an end-use application.

Input beam 20 is incident on a non-polarizing beam splitter 102 and a first portion thereof is reflected as a measurement beam 22. A second portion of input beam 20 incident on beam splitter 102 is transmitted as a reference beam 50. A portion of measurement beam 22 is reflected by non-polarizing beam splitter 104 to form measurement beam 24 after reflection by mirror 112A. Beam 24 is incident on optical cavity 130. The reflection coefficient for non-polarizing beam splitter 104 is preferably ≥95% so as not to significantly reduce the intensity of beam 24.

Figure 2A:
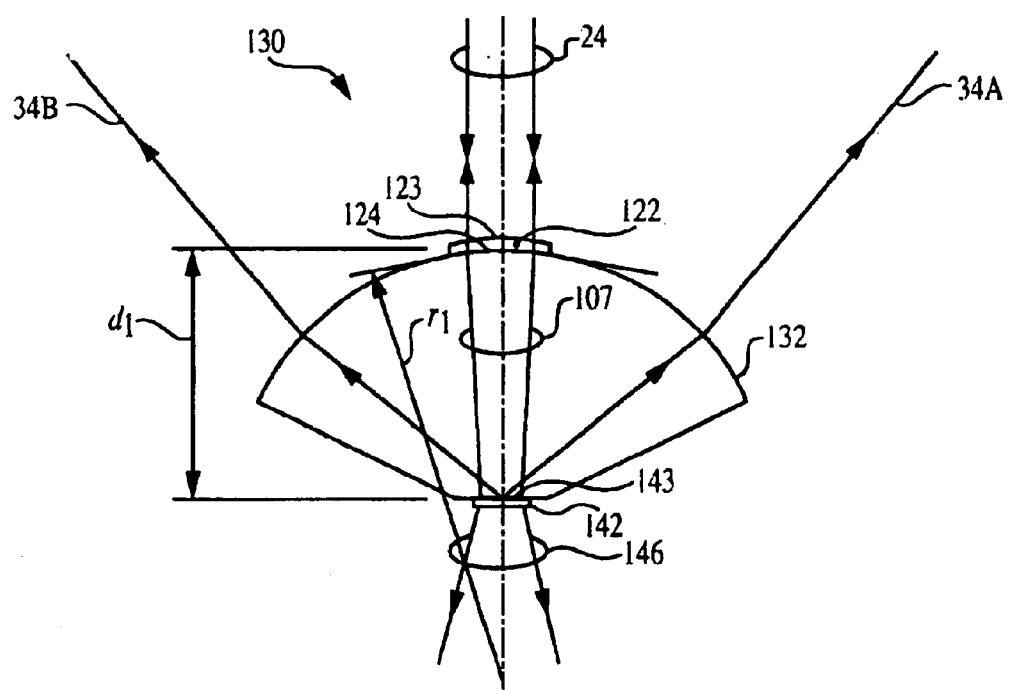
FIG. 2a illustrates, in schematic form, an optical cavity used in the first embodiment.

The propagation of measurement beam 24 through the optical cavity 130 is shown schematically in an expanded form in FIG. 2a. In the presently described embodiment, element 132 is an Amici type objective lens. Measurement beam 24 is focused by lenses 122 and 132 to a beam spot at aperture-array element 142 that encompasses an array of at least one wavelength or sub-wavelength aperture and at least one wavelength or sub-wavelength scattering site in aperture-array element 142. Aperture-array element 142 shown schematically in FIG. 2b in an expanded form is a conducting layer (e.g., a reflective layer) on a surface 143 of Amici type lens 132.

Figure 2B:
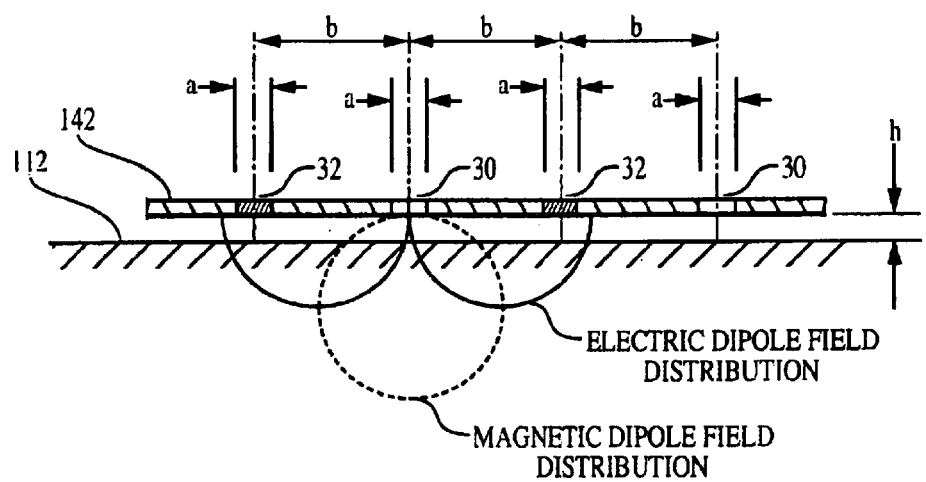
FIG. 2b illustrates, in schematic form, a wavelength or sub-wavelength aperture array used in the first embodiment.

The wavelength or sub-wavelength apertures and the wavelength or sub-wavelength scattering sites are elements 30 and 32, respectively, as indicated in FIG. 2b. Wavelength and/or sub-wavelength scattering sites 32 are preferably non-transmitting conducting elements with a complex index of refraction different from the complex index of refraction of the conducting material of aperture-array element 142. The complex indices of refraction are different so that elements 32 effectively serve as wavelength or sub-wavelength scattering sites. The diameter of elements 30 and 32 is a with $a<\lambda_1$, preferably $a<<\lambda_1$, where $\lambda_1$ is the wavelength of measurement beam 24. The separation of elements 30 and 32 is b with $b>a$, preferably $b>>a$. The thickness of conducting material of aperture-array element 142 is of the order of 20 nm and chosen so that the fraction of a beam transmitted by sections of aperture-array element 142 not containing wavelength or sub-wavelengths 30 is $<<1$.

The relative spacing of elements 30 in aperture-array element 142 may be further selected to minimize the effect of one wavelength or sub-wavelength aperture on the transmission properties of a second wavelength or sub-wavelength aperture.

The diameters of wavelength or sub-wavelength apertures 30 need not be restricted to a single diameter as shown schematically in FIG. 2b but may beneficially comprise two or more diameters for an end-use application. Further, the shape of wavelength or sub-wavelength apertures 30 may comprise shapes other than circular, e.g., a square or rectangle, without departing from the spirit and scope of the present invention.

The spacing of wavelength or sub-wavelength apertures 30 need not be restricted to a single value as shown schematically in FIG. 2b but may beneficially comprise two or more different spacings for an end-use application without departing from the spirit and scope of the present invention.

Further, the arrangement of wavelength or sub-wavelength apertures 30 may be arranged in various geometric patterns or random patterns without departing from the spirit and scope of the present invention.

The apertures 30 in element 142 can be formed as holes in a mask or as transmissive dielectric regions in an otherwise non-transmissive mask, e.g., transmissive vias in an otherwise reflective element. Moreover, the dielectric material in element 142 defining the apertures 30 can form a waveguide or optical cavity that enhances the transmission of the near-field probe beam to the sample. See, e.g., the previously cited application "Multiple-Source Arrays For Confocal And Near-Field Microscopy." Furthermore, in the presently described embodiment, the mask portion of element 142 is described as conducting to indicate that it is reflective. In other embodiments, element 142 is not necessarily conductive, but is, generally, not transmissive, with the coupling of the near-field probe beams to the sample being accomplished by the apertures 30 in element 142.

Figure 9:
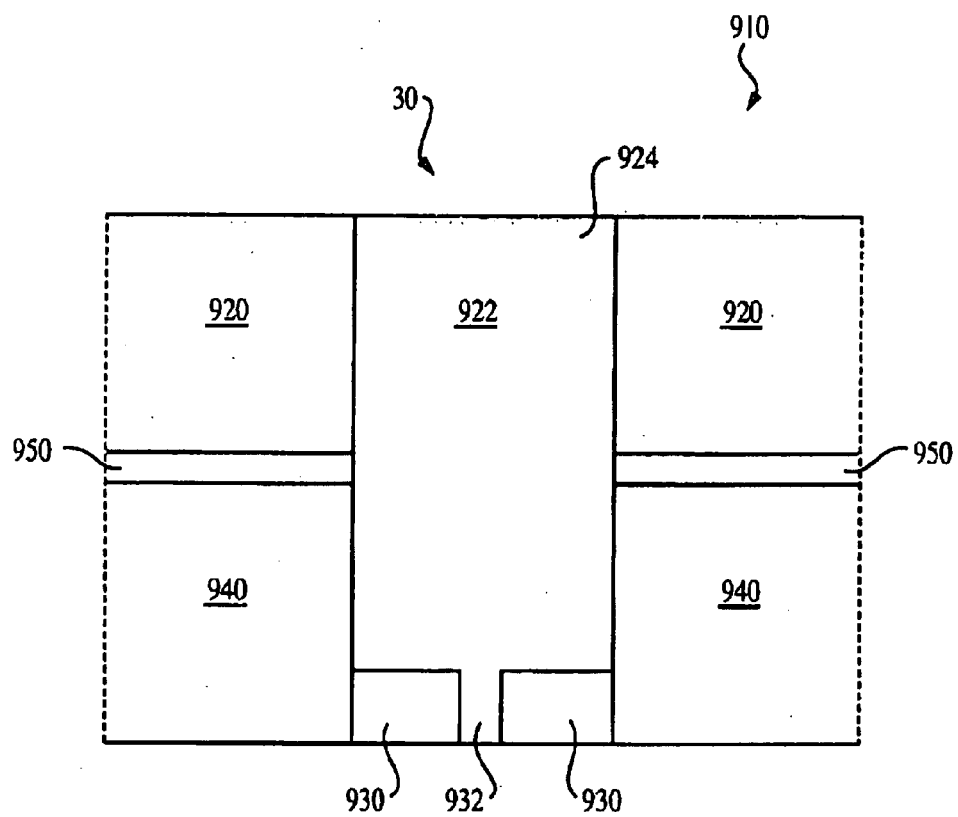
FIG. 9 illustrates, in schematic form, a mask array having formed by waveguide elements in an reflective dielectric stack.

For example, in some embodiments, the structure of element 142 at each aperture 30 may take the form of element 910 shown in FIG. 9.

In particular, element 910 includes a reflective dielectric stack 920 and an end mask portion 930 having an array of secondary apertures 932. Each aperture 30 includes a waveguide 922 formed by a dielectric material 924 extending through dielectric stack 920 and the secondary aperture 932. Furthermore, in some embodiments the end mask portion may provide more than one secondary aperture for with each waveguide. As is known in the art, dielectric stack 920 may be formed by alternating layers of dielectric material having refractive indices $n_1$ and $n_2$. Furthermore, dielectric material 924 forming waveguide 922 may have an refractive index $n_3$, such that $n_3>n_1$ and $n_3>n_2$. End mask portion 930 may be formed by a metal layer, and secondary aperture 932 may be selected to be a sub-wavelength aperture. In other words, secondary aperture may have a transverse dimension smaller than that necessary to support a propagating mode in dielectric material 924.

The resulting structure has the advantage of providing a highly reflective interface (that formed by the reflective dielectric stack) at surface 143 of the optical cavity, thereby enhancing the radiation build-up in cavity 130. Waveguide 922 couples radiation from optical cavity 130 to the opposite side of dielectric stack 920 where it is incident on end mask portion 930 and radiates to the object through sub-wavelength secondary aperture 932.

Furthermore, to suppress multiple reflections between the object and the surface of element 910 nearest the object, element 910 may further include an anti-reflection layer 940 formed on the surface of element 910 nearest the object. For example, the anti-reflection layer 940 may surround end mask portion 930 and waveguide 922 as shown in FIG. 9. The anti-reflection layer 940 may be formed by some combination of dielectric and/or metal layers. Moreover, element 910 may further include a metal layer 950 sandwiched between dielectric stack 920 and anti-reflection layer 940 to minimize their interaction between.

One example of a suitable series of layers for the anti-reflection coating is as follows: a first 51 nm layer of silicon dioxide, a second layer 6 nm layer of Beryllium, a third 51 nm layer of silicon dioxide, followed by a fourth 50 nm layer of Aluminum on a silicon dioxide substrate, wherein the coating is designed to prevent reflections from an interface between the first layer and air.

Also, waveguide 922 may be designed to form a second cavity that re-circulates at least some of the radiation that would otherwise be scattered by secondary aperture 932. In such cases, the length of waveguide 922 is selected to cause the second cavity to be resonant, or at least substantially resonant, at the wavelength of the radiation.

Additional embodiments of the invention may include element 142 having one or more those features described in connection with element 910. The wavelength or sub-wavelength apertures may further comprise a Fresnel zone plate or a microlens to alter beneficially in certain end-use applications the transmission through an array of wavelength or sub-wavelength apertures without departing from the spirit and scope of the present invention. In certain other end-use applications, gratings may be added to an array of wavelength or sub-wavelength apertures operating as spatial filters of reflected/scattered or transmitted near-field probe beam(s) to alter properties of the reflected/scattered or transmitted near-field probe beam(s) without departing from the spirit and scope of the present invention.

Beam 24 is incident on surface 123 of lens 122, transmitted by surface 123 and then incident on optical cavity 130. Optical cavity 130 comprises a highly reflective interface between lens 122 and Amici type lens 132, Amici type lens 132, and a reflecting interface between aperture-array element 142 and Amici type lens 132. Lens 122, Amici type lens 132, and aperture-array element 142 are preferably bonded together with an optical grade index matching cement. Surface 133 of Amici type lens 132 has the same surface figure as surface 124 of lens 122 and surface 134 of Amici type lens 132 has the same surface figure as surface 143 of aperture-array element 142 which hereinafter are referred to as interfaces 124 and 143, respectively (element numbers 133 and 134 are not shown in FIG. 2a). Lens 122 comprises surfaces 123 and 124 with surface 123 preferably antireflection coated for the wavelength of beam 24.

The index of refraction of Amici type lens 132 is preferably selected to be a large value so as to yield a substantially reduced wavelength therein and improved limiting optical resolution.

Optical cavity 130 is excited by the measurement beam incident on interface 124 with a corresponding buildup of beam 107 inside optical cavity 130. The intensity of beam 107 is significantly larger than the intensity of beam 24 and as such can lead to an enhanced transmission through apertures 30. Control of properties of optical cavity 130 with respect to build up of beam 107 is subsequently described in the description of the first embodiment.

A first portion of beam 107 incident on wavelength or sub-wavelength apertures 30 is transmitted as a near-field probe beam. A portion of the near-field probe beam is incident on object material 112 and a portion thereof is reflected and/or scattered back to the wavelength or sub-wavelength apertures 30 and a portion thereof is transmitted as a near-field return probe beam.

The spatial separation of adjacent surfaces of object material 112 and aperture-array element 142 is h as indicated in FIG. 2b. The value of h is preferably of the order of 2a with a lateral resolution approximately equal to h. A second portion of beam 107 incident on wavelength or sub-wavelength apertures 30 is reflected and/or scattered as a first background return beam. A portion of beam 107 incident on wavelength or sub-wavelength scattering sites 32 is reflected and/or scattered as a second background return beam. The near-field return probe beam, the first background return beam, and the second background return beam exit Amici type lens 132 as return beam 34 shown as rays 34A and 34B in FIG. 1 wherein return beam 34 comprises rays between rays 34A and 34B. Return beam 34 is collimated by lens 60 as return beam 36. Return beam 36 is shown as rays 36A and 36B in FIG. 1 and beam 36 comprises rays between rays 36A and 36B.

A portion of reference beam 50 reflected by mirror 112B and incident on non-polarizing beam splitter 106 is reflected as reference beam 52. Reference beam 52 is incident on reference object 130R and a portion thereof is transmitted as transmitted reference beam 54. Beam 54 is shown as rays 54A and 54B in FIG. 1 and beam 54 comprises rays between rays 54A and 54B. Beam 54 is collimated by lens 66 and transmitted by phase shifter 64 as a transmitted reference beam 86. Beam 56 is shown as rays 86A and 86B in FIG. 1 and beam 56 comprises rays in between rays 56A and 56B. Phase shifter 64 introduces a relative phase shift of $\chi$ in the transmitted reference beam 56. The magnitude of phase shift $\chi$ is controlled by control signal 158 from electronic controller, signal processor, and computer 200.

Figure 2C:
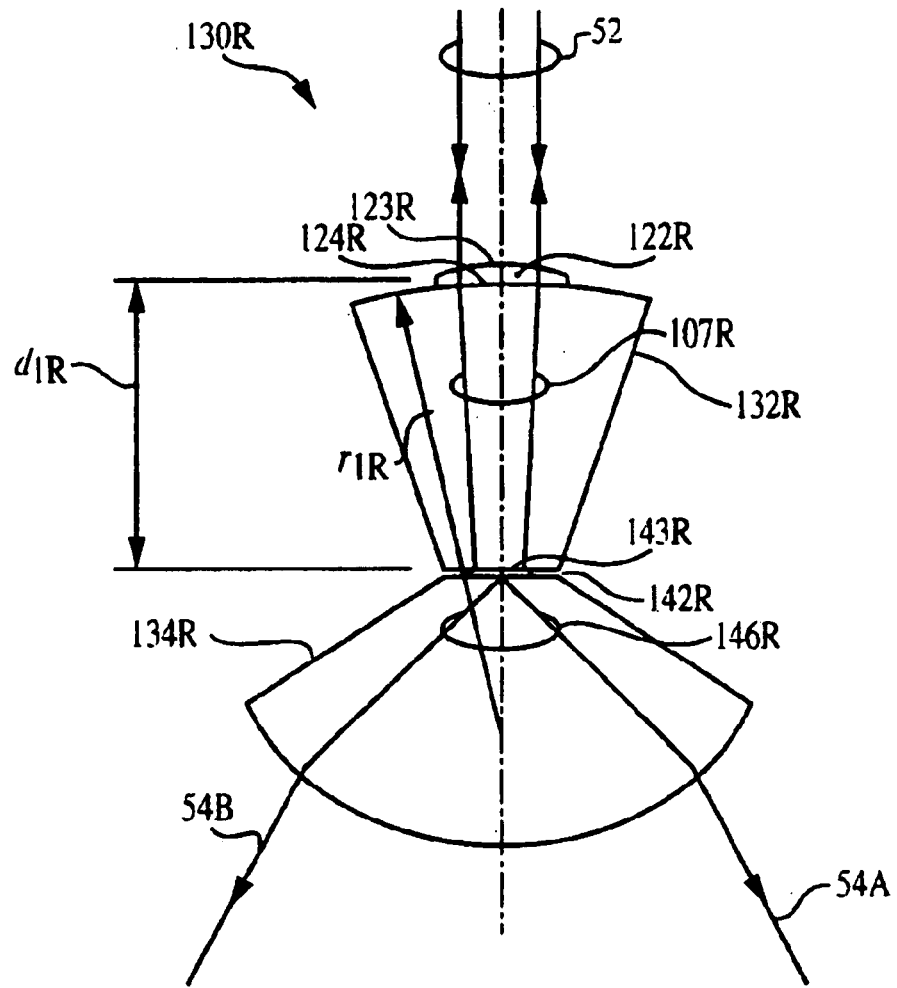
FIG. 2c illustrates, in schematic form, a reference object used in the first embodiment.
Figure 2D:
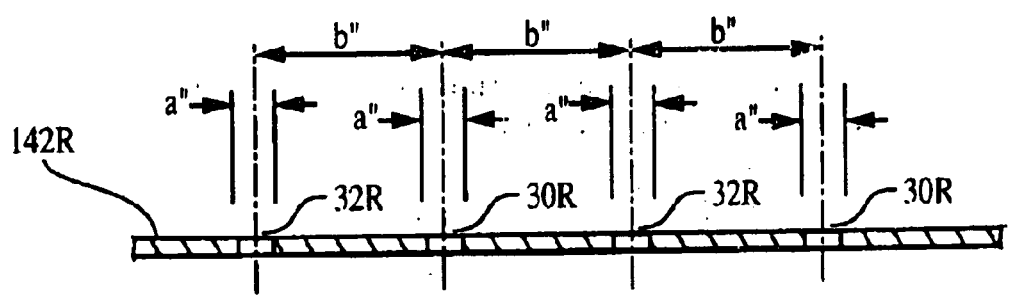
FIG. 2d illustrates, in schematic form, a reference object wavelength or sub-wavelength aperture array used in the first embodiment

The propagation of reference beam 52 through reference object 130R is shown schematically in an expanded form in FIG. 2c. Reference object 130R comprises lens 122R, a dielectric material 132R, aperture array element 142R, and an Amici type lens 134. Reference beam 52 is focused by reference object 130R to a beam spot at aperture array element 142R that encompasses an array of wavelength or sub-wavelength apertures in aperture array element 142R. Aperture array element 142R is shown schematically in FIG. 2d in an expanded form as an array of wavelength or sub-wavelength apertures 30R and 32R on a surface of Amici type lens 134R. Wavelength or sub-wavelength apertures 30R and 32R generate transmitted reference beam components of beam 54 that correspond to wavelength or sub-wavelength elements 30 and 32, respectively, of element 142. The spacing b" of the wavelength or sub-wavelength apertures 30R and 32R and the imaging properties of Amici type lens 134R and of lens 66 are chosen such that wavelength or sub-wavelength apertures 30R and 32R and wavelength or sub-wavelength elements 30 and 32, respectively, are conjugates as seen by a subsequent imaging on to a detector. The diameter a" of the wavelength or sub-wavelength apertures 30R and 32R is chosen to be efficient in generating transmitted reference beam 56 with a diameter substantially the same as the diameter of return beam 36. The relative transmission of wavelength or sub-wavelength apertures 30R and 32R may be the same or beneficially different depending on an end-use application.

Reference object 130R comprises an optical cavity hereinafter referenced as the reference optical cavity. The reference optical cavity is defined by interfaces 124R and 143R as illustrated schematically in FIG. 2c and leads to an enhanced transmission of reference beam 52 through wavelength or sub-wavelength aperture array 142R. The remaining description of wavelength or sub-wavelength apertures 30R and 32R is the dame as corresponding portion of the description given for wavelength or sub-wavelength apertures 30. The description of the properties of the reference optical cavity is substantially the same as the corresponding portions of the description given for the properties of optical cavity 130.

Return beam 36 is incident on beam splitter 100 and a portion thereof is reflected as a return beam component of beam 38. Beam 38 is shown as rays 38A and 38B in FIG. 1 and beam 38 comprises rays between rays 38A and 38B. Reflected reference beam 56 is incident on beam splitter 100 and a portion thereof is transmitted as a transmitted reference beam component of beam 38. Beam 38 is incident on lens 62 and focused as mixed beam 40. Beam 40 is shown as rays 40A and 40B in FIG. 1. Beam 40 is focused onto a pinhole plane 114 such that a pinhole in image plane 114 is a conjugate image of either one of the wavelength or sub-wavelength apertures 30 or wavelength or sub-wavelength scattering sites 32.

Figure 2E:
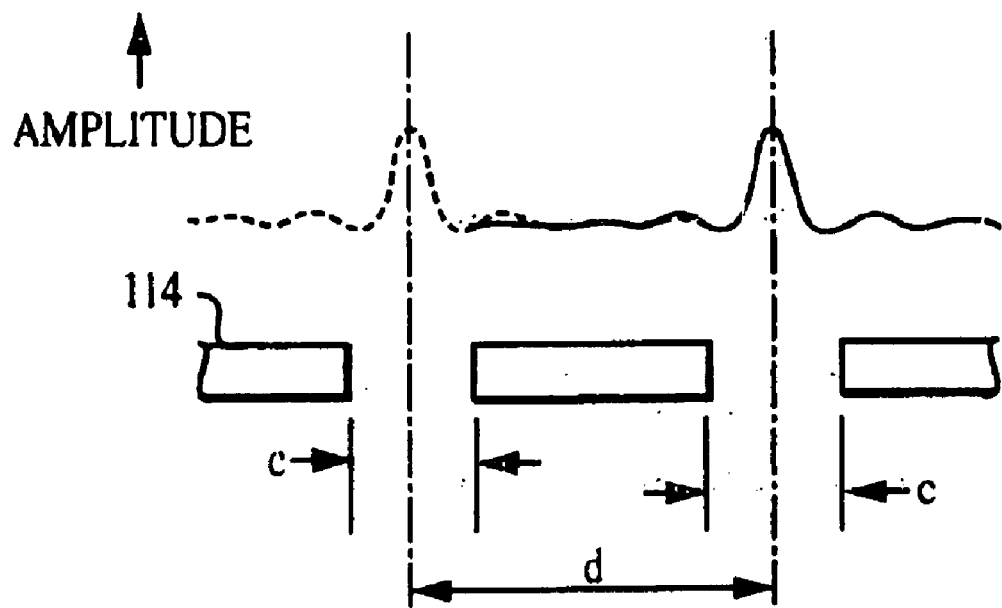
FIG. 2e illustrates, in schematic form, a detector aperture array used in the first embodiment.

Pinhole plane 114 is shown schematically in FIG. 2e. The diameter of the pinholes is c and the spacing between the pinholes is d. The spacing d is equal to the separation b of wavelength or sub-wavelength apertures 30 and wavelength or sub-wavelength scattering sites 32 times the magnification of the imaging system imaging wavelength or sub-wavelength apertures 30 and wavelength or sub-wavelength scattering sites 32 onto corresponding pinholes in pinhole plane 114. Diameter c is selected to be approximately twice the size of a diffraction limited image of a point object by the imaging system and the spacing d is selected to be larger than c, preferably $\geq$ to approximately four times the size of a diffraction limited image of a point object by the imaging system. Typical amplitude functions of diffraction limited images of wavelength or sub-wavelength apertures 30 and wavelength or sub-wavelength sites 32 are shown in FIG. 2e as a dashed and solid profiles, respectively.

A portion of beam 40 is transmitted by the pinholes in pinhole plane 114 and detected by a detector 116, preferably by a quantum photon detector [see Section 15.3 in Chapter 15 entitled "Quantum Detectors", *Handbook of Optics*, 1, 1995 (McGraw-Hill, New York) by P. R. Norton]. Detector 116 comprises an array of pixels. The array of pixels may comprise either a pair of pixels, a one dimensional array of pixels, or a two dimensional array of pixels, according to the requirements of an end-use application, with a one-to-one mapping of pinholes in pinhole plane 114 and the pixels of detector 116.

Detector 116 generates an electrical interference signal comprising an array of signal values $[S_n]$ corresponding to the array of pixels. Subscript n is an index indicating an element in the array of signal values $[S_n]$. The array of signal values $[S_n]$ may comprise a pair of elements, a one-dimensional array comprising at least three elements, or a two-dimensional array depending on an end-use application. Also, in other embodiments, the measurement and reference beam components in beam 38 may have different, e.g., orthogonal, polarizations, in which case a polarizer may be added to mix the polarizations of the measurement and reference beam components in beam 38 to cause the interference signal at detector 116.

The array of signal values $[S_n]$ may be written to a good approximation as $$[S_n]=[(S_D+S_I)_n] \quad (1)$$

where term $(S_D)_n$ represents terms either associated with wavelength or sub-wavelength apertures 30 or associated with wavelength or sub-wavelength sites 32 and term $(S_I)_n$ represents interference cross terms either associated with wavelength or sub-wavelength apertures 30 or associated with wavelength or sub-wavelength sites 32.

A $(S_D)_n$ term associated with wavelength or sub-wavelength apertures 30 is proportional to the sum of the amplitude magnitudes squared of the corresponding portions of the near-field return probe beam, of the first background return beam, and of the reflected reference beam and interference cross terms between complex amplitudes of the near-field return probe beam and of the first background return beam. A $(S_D)_n$ term associated with wavelength or sub-wavelength sites 32 is proportional to the sum of the amplitude magnitudes squared of the corresponding portions of the second background return beam and of the reflected reference beam. A $(S_I)_n$ term associated with wavelength or sub-wavelength apertures 30 is proportional to the sum of the interference cross terms between complex amplitudes of the near-field return probe beam and of the reflected reference beam and between complex amplitudes of the first background return beam and of the reflected reference beam. A $(S_I)_n$ term associated with wavelength or sub-wavelength sites 32 is proportional to the interference cross term between complex amplitudes of the second background return beam and of the reflected reference beam.

Term $(S_D)_n$ is independent of phase shift $\chi$. Term $(S_I)_n$ is a sinusoidal function of phase shift $\chi$ and may be written as $$(S_I)_n=(|S_I|\cos(\phi+\chi))_n \quad (2)$$

where $(|S_I|)_n$ and $\phi$ are an amplitude and phase, respectively, related to the complex amplitudes contributing to $(S_I)_n$.

Operation of apparatus of the first embodiment of the present invention depicted in FIGS. 1, 2a, 2b, 2c, 2d, and 2e is based on the acquisition of a sequence of four measurements of arrays of signal values. The sequence of the four arrays of signal values $[S_n]_1$, $[S_n]_2$, $[S_n]_3$, and $[S_n]_4$ are obtained by detector 116 with phase shifter 64 introducing a sequence of phase shifts $\chi_0$, $\chi_0+\pi$, $\chi_0+\pi/2$, and $\chi_0+3\pi/2$ radians, respectively, where $\chi_0$ is some fixed value of phase shift $\chi$. The four arrays of signal values $[S_n]_1$, $[S_n]_2$, $[S_n]_3$, and $[S_n]_4$ are sent to electronic controller, signal processor, and computer 200 as signal 131, in either digital or analog format, for subsequent processing.

Conventional conversion circuitry, i.e., analog-to-digital converters, is included in either detector 116 or electronic controller, signal processor, and computer 200 for converting the four arrays $[S_n]_1$, $[S_n]_2$, $[S_n]_3$ and $[S_n]_4$ to a digital format. Phase shift $\chi$ introduced by phase shifter 64 is controlled by signal 158 where signal 158 is generated and subsequently transmitted by electronic controller, signal processor, and computer 200. Phase shifter 64 can be of an electro-optical type.

Next, two arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200. Elements of the arrays of signal value differences corresponding to pixels that are associated with wavelength or sub-wavelength apertures 30 contain substantially with relatively high efficiency only two interference cross terms, a first interference cross term between the complex amplitude of the near-field return probe beam and of the complex amplitude of the reflected reference beam and a second interference cross term between the complex amplitude of the first background return beam and of the complex amplitude of the reflected reference beam. Elements of the arrays of signal value differences corresponding to pixels that are associated with wavelength or sub-wavelength sites 32 contain substantially with relatively high efficiency only the interference cross term between the complex amplitude of the second background return beam and of the complex amplitude of the reflected reference beam.

The relatively high efficiency for isolation of effects of amplitudes of beams associated with wavelength or sub-wavelength apertures 30 and wavelength or sub-wavelength sites 32 in the measured signal values is controlled by the choice of parameters c and d.

The complex amplitude of the near-field return probe beam is computed by electronic controller, signal processor, and computer 200 from the amplitude of the first interference term between the complex amplitude of the near-field return probe beam and the amplitude of the reflected reference beam. The computation comprises using measured values of the interference cross term between the complex amplitude of the second background return beam and of the complex amplitude of the reflected reference beam to compensate the measured values of elements of signal value differences associated with sub-wavelength apertures 30 for the contribution of the second interference cross term between the complex amplitude of the first background return beam and of the complex amplitude of the reflected reference beam. The computation further comprises using measured values for the amplitude magnitude squared of the portions of the reflected reference beam transmitted by the pinholes of pinhole plane 114 and detected by detector 116.

Next, the plane of polarization of input beam 20 is rotated by 90° by phase retardation element 18 in response to signal 128 from electronic controller, signal processor, and computer 200. A second set of four arrays of signal values $[S_n]_5$, $[S_n]_6$, $[S_n]_7$, and $[S_n]_8$ corresponding to measured arrays of signal values $[S_n]_1$, $[S_n]_2$, $[S_n]_3$, and $[S_n]_4$ are obtained by detector 116. Arrays of signal value differences $[S_n]_1-[S_n]_2=[(S_I)_n]_1-[(S_I)_n]_2$ and $[S_n]_3-[S_n]_4=[(S_I)_n]_3-[(S_I)_n]_4$ are computed by electronic controller, signal processor, and computer 200. The complex amplitude of the near-field return probe beam for the orthogonally polarized input beam 20 is computed by electronic controller, signal processor, and computer 200 by the same algorithm as used to compute the complex amplitude of the near-field return probe beam for the non-rotated polarization state of input beam 20.

Object material 112 is mounted on an object chuck 160. The angular orientation and height of object chuck 160 is controlled by three transducers, two of which are shown as 161A and 161B, that are attached to chuck stage 162. The angular orientation and height of object material 112 relative to the surface of conducting element 28 are detected and used to generate error signals. The detection and generation of error signals may be by known techniques in the art such as cap gauges, precision distance measuring interferometry including wave domain reflectometry [see, e.g., commonly owned U.S. patent application with Ser. No. 09/089,105 and entitled "Methods And Apparatus For Confocal Interference Microscopy Using Wavenumber Domain Reflectometry And Backgroung Amplitude Reduction And Compensation" by Henry A. Hill, the contents of which are incorporated herein by reference], and scanning interferometric near-field microscopy [see, e.g., the previously mentioned provisional application entitled "Control of Position and Orientation of Sub-Wavelength Aperture Array in Near-field Scanning Microscopy" by Henry A. Hill.]

The error signals are transmitted as a component of signal 166 to electronic controller, signal processor, and computer 200. Servo control signals are generated by electronic controller, signal processor, and computer 200 from the error signals and transmitted as a servo control signal component of signal 166 to chuck stage 162. Transducers 161A, 161B, and the third transducer (not shown) alter the orientation and/or height of object material 112 according to the servo control signal component of signal 166.

The location of chuck stage 162 in a plane substantially parallel to the surface of conducting element 28 is controlled by translator 164. The location of chuck stage 162 is detected by known techniques in the art such as precision distance measuring interferometry and error signals transmitted as an error signal component of signal 168 to electronic controller, signal processor, and computer 200 [see U.S. patent application with Ser. No. 09/252,266 entitled "Interferometer And Method For Measuring The Refractive Index And Optical Path Length Effects Air" by Peter de Groot, Henry A. Hill, and Frank C. Demarest filed Feb. 18, 1999 and U.S. patent application with Ser. No. 09/252,266 entitled "Apparatus And Method For Measuring The Refractive Index And Optical Path Length Effects Of Air Using Multiple-Pass Interferometry" by Henry A. Hill, Peter de Groot, and Frank C. Demarest filed Feb. 18, 1999, the contents of both applications being incorporated herein by reference.]

Servo control signals are generated by electronic controller, signal processor, and computer 200 from the error signal component of signal 168 and transmitted as a servo signal component of signal 168 to translator 164. Translator 164 controls the location and orientation of chuck stage 162 in one or two orthogonal directions and in one or two orthogonal planes of orientation, according to the requirements of an end-use application, in response to the servo signal component of signal 168.

Next, the object material 112 is scanned in a combination of one or two orthogonal directions substantially parallel to the surface of object material 112 and in the spatial separation of the conducting element 28 and the adjacent surface of object material 112 according to the requirements of an end-use application. Measured arrays of signal values $[S_n]_1$, $[S_n]_2$, $[S_n]_3$, and $[S_n]_4$ and, if required by an end-use application, measured arrays of signal values $[S_n]_5$, $[S_n]_6$, $[S_n]_7$, and $[S_n]_8$ are obtained as a function of the scanned parameters and the amplitude and phase of the respective interference cross terms between the complex amplitude of the respective near field return probe beam and of the respective complex amplitude of the reflected reference beam computed by electronic controller, signal processor, and computer 200.

Information with apparatus of the first embodiment about object material 112 is acquired in the presence of a significantly reduced background signal. Sources of contributions to the background signal comprise the first background return beam, the return measurement beam, a background produced by reflection and/or scattering of other beams associated with the measurement beam in the apparatus of the first embodiment, and corresponding beams associated with the reflected reference beam. The background signal is significantly reduced first because the apparatus of the first embodiment comprises a confocal optical imaging/detecting system and second because of the background compensation procedure based on measurement of the second background return beam.

The background compensation procedure based on measurement of the second background return beam compensates for the first background return beam that is not discriminated against by the confocal imaging/detecting properties of the apparatus of the first embodiment. It should be noted that The background compensation procedure based on measurement of the second background return beam further compensates for the scattered/reflected beams generated in plane sections displaced from the plane section being imaged not discriminated against by the confocal imaging/detecting properties of the apparatus of the first embodiment.

The scanning of object material 112 in a combination of one or two orthogonal directions substantially parallel to the surface of object material 112 and in the spatial separation of the conducting element 28 and the adjacent surface of object material 112 is implemented for the first embodiment as a "step and repeat" mode. The first embodiment modified for a continuous scan mode of operation is subsequently described as the third embodiment of the present invention.

The scanning of object material 112 in a combination of one or two orthogonal directions substantially parallel to the surface of object material 112 and in the spatial separation of the aperture array element 142 from the adjacent surface of object material 112 is implemented for the first embodiment as a "step and repeat" mode. The first embodiment modified for a continuous scanning mode of operation is subsequently described as the third embodiment of the present invention.

The electric fields generated by any multipole source located at wavelength or sub-wavelength apertures 30 and associated with the near field probe beams for the first, embodiment and variants thereof generally have restricted ranges in directions at a specific location in object material 112. This feature of the present invention generally leads to a simpler inverse calculation for properties of the object material 112 from the measured arrays of signal values $[S_n]_1$, $[S_n]_2$, $[S_n]_3$, and $[S_n]_4$ and, if required by an end-use application, measured arrays of intensity values $[S_n]_3-[S_n]_4=[(S_I)_n]_3-[(S_I)_n]_4$ as compared to the inverse calculation encountered in profilers, interferometric or otherwise, which rely a spatial resolution defined by imaging with a traditional optical system.

The inverse calculation is simpler in the present invention because is the directions of propagation of components of a near-field probe beam at a given volume section of an object being profiled/imaged are substantially the same for a given measured amplitude and phase of a reflected/scattered near-field probe beam from the volume section wherein the dimensions of the volume section are much less than the dimensions of the source of the near-field probe beam. The inversion type of calculation is further simplified in the present invention because is the directions of propagation of components of a reflected/scattered near-field probe beam from a given volume section of an object being profiled/imaged are substantially the same for a given measured amplitude and phase of a reflected/scattered near-field probe beam from the volume section The inversion type of calculation is also further simplified in the present invention because the directions of propagation of components of a near-field probe beam at a given volume section of an object being profiled/imaged and the directions of propagation of components of a resulting reflected/scattered near-field probe beam from the volume section of the object being profiled/imaged are substantially in opposite directions for a given measured amplitude and phase of a reflected/scattered near-field probe beam from the volume section.

Optical cavity 130 under certain conditions is a stable resonant cavity excited by the beam incident on optical cavity 130. Certain properties of particular interest with respect to the first embodiment are (1) a resonant condition that leads to excitation of optical cavity 130 by the beam incident on optical cavity 130 with a corresponding buildup of optical beam 107 in optical cavity 130, (2) a condition for cavity stability for a given transverse mode, (3) a condition for exciting a stable transverse mode, and (4) a condition relating to the rate of compensation of optical cavity 130 for a perturbation of the wavefront of a stable transverse mode. Excitation of optical cavity 130 with the buildup of beam 107 inside optical cavity 130 reaches a maximum when $$\lambda_1 = (2\eta_1 d_1/p_1) \tag{3}$$

where $\eta_1$ is the index of refraction of Amici type lens 132 for wavelength $\lambda_1$, $d_1$ is the spacing between interfaces 124 and 143, and $p_1$ is an integer. Beam 107 comprises a standing wave in optical cavity 130. The intensity of beam 107, when the resonant condition expressed by Eq. (3) is satisfied, is in general larger than the intensity of the beam incident on cavity 130 and determined in part by the effective reflectivities $R_1$ and $R_2$ of interfaces 124 and 143, respectively.

There are a variety of resonator configurations that can be used for optical cavity 130. The use of slightly curved surfaces for interfaces 124 and/or 143 leads to much lower diffraction losses of a transverse mode than does a configuration wherein interfaces 124 and 143 are both planar surfaces, and the slightly curved surface configuration also has much less stringent alignment tolerances.

The preferred configuration of interface 143 is planar although the configuration of interface 143 could be curved according to an end-use application without departing from the scope or spirit of the instant invention. Accordingly, the preferred surface geometry for interface 124 is curved with a radius of $r_1$. Interface 124 may, however, be planar without departing from the spirit or scope of the instant invention. With the radius of curvature of interface 143 being $r_2$, the condition for a stable transverse mode is given by $$0 < \left(1 - \frac{d_1}{r_1}\right)\left(1 - \frac{d_1}{r_2}\right) < 1. \tag{4}$$

Thus, not all cavity configurations are stable with for example, the planar configuration, $r_1=r_2=\infty$, and the hemispherical configuration, $r_1=d_1$ and $r_2=\infty$, being just on the edge of stability.

A stable mode comprises a beam in optical cavity 130 that results from a cavity configuration which concentrates the beam toward the resonator axis in a regular pattern as it traverses back and fourth within the cavity, rather than allowing it to diverge and escape from the resonator. Therefore when the resonant condition is satisfied, optical cavity 130 increases the component of intensity of beam 107 propagating towards and in the vicinity of wavelength/sub-wavelength apertures 30 and wavelength/sub-wavelength sites 32 over that intensity which would be obtained in the absence of optical cavity 130. When the resonant condition is satisfied, the increase in intensity of the component of beam 107 at interface 124 propagating away from interface 124 is given to a good approximation for a non-absorbing cavity by $$\frac{T_1}{[1 - (R_1 R_2)^{1/2}]^2}, \tag{5}$$

$T_1=(1-R_1)$ for a non-absorbing interface, when (1) the radius of curvature of the wavefront of beam 107 at surface 122 is equal to the radius of curvature $r_1$, (2) the widths of the beam incident on cavity 130 and of beam 107 at interface 124 are equal, and (3) the amplitude distribution of the beam incident on optical cavity 130 at interface 124 matches the amplitude distribution of the stable transverse mode of optical cavity 130 at interface 124.

The widths of the beam incident on optical cavity 130 and of beam 107 are equal at interface 124 when the width of the beam incident on optical cavity 130 at interface 124 matches the width of a stable transverse mode of optical cavity 130 and the amplitude distribution of the beam incident on optical cavity 130 at interface 124 matches the amplitude distribution of the stable transverse mode of optical cavity 130 at interface 124. The preferred stable transverse mode for cavity 130 is a $TEM_{00}$ mode, i.e., a Gaussian mode.

An important property of an excited Gaussian mode is that the associated wavefront at interface 143 is uniphase when the resonant condition of Eq. (3) is satisfied. In addition, the associated wavefront at interface 143 is planar.

When the resonant condition of Eq. (3) is satisfied but the radius of curvature $r_1$ is not equal to the radius of curvature of the wavefront of beam 107 at interface 124, the amplitude distribution of the resulting built-up beam in optical cavity 130 at interface 124 is different from the amplitude distribution of a stable mode and of the amplitude distribution of the beam incident on optical cavity 130.

As a consequence, optical cavity 130 configured for meeting the resonant condition and the condition for a transverse mode to be excited by the beam incident on optical cavity 130, an enhancement of optical transmission through wavelength/sub-wavelength apertures 30 is achieved over that transmission which would be obtained in the absence of optical cavity 130 by the ratio given by Eq. (5) multiplied by the square of the ratio of the diameter of the intercavity beam intensity at interface 124 to the corresponding diameter at interface 143. As such supports enhanced transmission is achieved in the first embodiment of an optical beam through an array of wavelength/sub-wavelength apertures.

The maximum enhancement is obtained when the term given by Eq. (5) is a maximum. The term given in Eq. (5) is a maximum when reflectivity $R_1$ is chosen such that for a given value of $R_2$, $$R_1 = R_2 \tag{6}$$

and the enhancement is increased as reflectivity $R_2$ is increased towards the value of 1. It was assumed in deriving Eq. (6) that $T_1 + R_1 = 1$.

Beam 107 forms a waist with radius $w_1$ at interface 143. The dimension $2w_1$ is selected to be large enough to encompass a preselected portion of aperture-array element 142. As is known in the art, the value of $w_1$ is related to the values of $d_1$ and $r_1$.

Another condition on the system may be considered to enhance transmission of the optical beam through wavelength/sub-wavelength apertures 30. That condition may be derived considering the angular width of beams back scattered or diffracted backwards at interface 143 as $$\lambda_1 d_1 \geq \eta_1 ab \tag{7}$$

where a and b are lengths characteristic of the size and spacing, respectively, of wavelength/sub-wavelength apertures 30. This condition will hereinafter be referenced as the redistribution condition.

Thus when the redistribution condition expressed by Eq. (7) is met by optical cavity 130 and wavelength/sub-wavelength apertures 30 and beam 107 has the properties of a stable transverse mode for a case when wavelength/sub-wavelength apertures 30 and wavelength/sub-wavelength sites 32 are absent, a utilitarian redistribution of optical power in optical cavity 130 is achieved for the case when wavelength/sub-wavelength apertures 30 are present such that the spatial properties of beam 107 are substantially the same. As a further consequence of the spatial properties of beam 107 being substantially the same as the spatial properties of a stable transverse mode, the value for reflectivity $R_2$ is to a good approximation a weighted average of the reflectivity of the portion of interface 143 not occupied by wavelength/sub-wavelength apertures 30 and wavelength/sub-wavelength sites 32 and of the reflectivity of the wavelength/sub-wavelength apertures 30 and wavelength/sub-wavelength sites 32 for reflection of an optical beam back into the stable transverse mode excited in optical cavity 130.

Wavelength $\lambda_1$ and/or the optical path length $\eta_1 d_1$ of optical cavity 130 are adjusted in the first embodiment so that the resonant condition expressed by Eq. (3) is satisfied. Wavelength $\lambda_1$ of source 10 may be adjusted for example by changing the injection current of a source comprising a diode laser or by changing the length of the cavity of a source 10 comprising a laser. The optical path length $\eta_1 d_1$ of optical cavity 130 is adjusted by changing the temperature of the element 132.

A measured reflectivity of optical cavity 130 is used to generate a servo control signal 154 for the control of either $\lambda_1$, if not controlled by servo control signal 186R derived from reflection properties of the reference optical cavity, and/or the optical path length $\eta_1 d_1$ of optical cavity 130 through control of the temperature of cavity 130 so that the resonant condition expressed by Eq. (3) is satisfied. Servo control signal 154 is shown in FIG. 1 for the control of the wavelength of source 10. A portion of the beam incident on optical cavity 130 is reflected back to non-polarizing beam splitter 104, after reflection by mirror 112A, where a portion thereof is transmitted by non-polarizing beam splitter 104 as beam 109.

Beam 109 is detected by detector 150, preferably by a quantum photon detector [see Section 15.3 in Chapter 15 entitled "Quantum Detectors", *Handbook of Optics*, 1, 1995 (McGraw-Hill, New York) by P. R. Norton], as electrical signal 152. Signal 152 is transmitted to electrical controller, signal processor, and computer 200 to generate servo control signal 154. The reflectivity $R_{C1}$ of optical cavity 130 at interface 124 is given by the formula $$R_{C1} = 1 - \frac{T_1 T_2}{[1-(R_1 R_2)^{1/2}]^2 + 4(R_1 R_2)^{1/2}\sin^2(\delta_1/2)} \tag{8}$$

where $$\delta_1 = 2k_1\eta_1 d_1, \tag{9}$$

$T_2 = (1 - R_2)$ for a non-absorbing interface, and wavenumber $k_1 = 2\pi/\lambda_1$.

For generation of control signal 154, wavenumber $k_1$ is modulated by a small amount at angular frequency $\omega_1$ so as to amplitude modulate phase $\delta_1$ with an amplitude $\Delta\delta_1$. The error signal upon which control signal 154 is based comprises the amplitude and phase of the first harmonic at angular frequency $\omega_1$ of signal 152. The amplitude and phase of the first harmonic is obtained using heterodyne techniques well known to those skilled in the art. The amplitude of the first harmonic is zero when resonant condition expressed by Eq. (3) is satisfied.

A deviation of phase $\delta_1$ from the value of $2\pi p_1$ will introduce a corresponding phase shift $\Phi_1$ between the phase of beam 146 transmitted by aperture-array element 142 relative to the phase of beam 24. In certain end-use applications, knowledge of phase shift $\Phi_1$ is not required. In other end-use applications wherein enhanced transmission through an array of apertures to produce a source comprising an array of wavelength or sub-wavelength sources in one or more locations, such as in an interferometric microscopy tool, knowledge of phase shift $\Phi_1$ may be required.

For those applications wherein a portion of a beam corresponding to beam 146 can not be split off by a beam splitter, e.g., due to spatial restrictions such as encountered with beam 146 of the first embodiment or the properties of arrays of signal values $[S_n]$ are not available for a determination phase shift $\Phi_1$, phase shift $\Phi_1$ can be measured and monitored by measuring and monitoring properties of the beam reflected by optical cavity 130. From the measurement of the reflectivity $R_{C1}$ of optical cavity 130, the optical path length $\delta_1$ can be determined using Eq. (8) with independent determinations of $R_1$ and $R_2$. The independent determinations of $R_1$ and $R_2$ are preferably based on measured behavior of reflectivity $R_{C1}$ of cavity 130 as $\delta_1$ is varied. Phase shift $\Phi_1$ is related to optical path length $\delta_1$ to a good approximation as $$\Phi_1 = \tan^{-1} \frac{(R_1 R_2)^{1/2} \sin\delta_1}{[1 - (R_1 R_2)^{1/2} \cos\delta_1]}. \tag{10}$$

Thus, phase shift $\Phi_1$ of beam 146 resulting from the enhanced transmission by aperture-array element 142 can be determined by measuring and monitoring reflectivity $R_{C1}$ and using Eq. (10) for a calculation of a corresponding $\Phi_1$.

An important property of optical cavity 130 is a relatively short time for build up and/or decay of a transverse mode. The 1/e time constant $\tau_1$ for the build-up or decay time of intensity in optical cavity 130 is given by the equation $$\tau_1 \cong \left(\frac{2\eta_1 d_1}{c}\right) \frac{1}{(T_1 + T_2)} \tag{11}$$

where c is the free space speed of light. For a non-limiting example of $d_1$=2.5 mm, optical cavity 130 comprising gallium phosphide with $\eta_1$=3.3 at $\lambda_1$=630 nm, and $R_1$=$R_2$=0.99, $$\tau_1 \cong 2.8 \text{ nsec.} \tag{12}$$

Another important consideration is the pulse width $\tau_{p1}$ for embodiments wherein a source corresponding to source 10 is a pulsed source, e.g., in a scanning near-field microscope. For enhanced transmission through aperture-array element 142 to be substantially the same when using a pulsed source in a scanning mode and when operating with a non-pulsed source in a non-scanning mode, there is a restriction on pulse width $\tau_{p1}$. The restriction on pulse width $\tau_{p1}$ is determined by consideration of the width in frequency of beam 24 comprising a pulsed beam and the full width at half maximum in frequency of the enhanced transmission through aperture-array element 142.

The full width at half maximum in frequency $\Delta v_{1/2}$ of beam 24 is $$\Delta v_{1/2} = \frac{1}{\tau_{p1}}. \tag{13}$$

The full width at half maximum in frequency $\Delta v_{C1}$ of the enhanced transmission through aperture-array element 142 is obtained from the free spectral range $c/(2\eta_{1\,d1})$ and finesse $F_1$ of optical cavity 130. Finesse $F_1$ is given by the formula $$F_1 = \pi \frac{(R_1 R_2)^{1/4}}{1 - (R_1 R_2)^{1/2}} \tag{14}$$

with $$\Delta v_{C1} = \frac{1}{\pi}\left(\frac{c}{2\eta_1 d_1}\right)\left(\frac{1 - (R_1 R_2)^{1/2}}{(R_1 R_2)^{1/4}}\right). \tag{15}$$

Note that $$\Delta v_{C1} \cong \frac{1}{2\pi\tau_1}. \tag{16}$$

The restriction on pulse width $\tau_{p1}$ is based on a requirement that $$\Delta v_{1/2} < \Delta v_{C1} \tag{17}$$

or on combining Eqs. (13), (16), and (17), $$\tau_{p1} > 2\pi\tau_1. \tag{18}$$

Accordingly, on combining Eqs. (11) and (18), $$\tau_{p1} > \pi\left(\frac{2\eta_1 d_1}{c}\right)\left(\frac{(R_1 R_2)^{1/4}}{1 - (R_1 R_2)^{1/2}}\right). \tag{19}$$

For a non-limiting example of $d_1$=2.5 mm, optical cavity 130 comprising gallium phosphide with $\eta_1$=3.3 at $\lambda_1$=630 nm, and $R_1$=$R_2$=0.99, the restriction pulse width $\tau_{p1}$ expressed by Eq. (19) is $$\tau_{p1} > 17 \text{ nsec.} \tag{20}$$

As a consequence of the inequality expressed by Eq. (18), pulse width $\tau_{p1}$ will be a parameter that in part controls the limiting value for spatial resolution in the direction of a scan to $$\tau_{p1} v \tag{21}$$

where v is the scan speed. For example, with a value of $\tau_{p1}$=50 nsec, a scan speed of v=0.20 m/sec, the $\tau_{p1}$ associated limiting spatial resolution in the direction of scan will be $$\tau_{p1} v = 10 \text{ nm.} \tag{22}$$

Thus, the use of an optical cavity in the first embodiment to generate enhanced transmissions through an array of wavelength and/or sub-wavelength apertures is compatible with both the wavelength and sub-wavelength spatial resolution requirements of a scanning near-field microscope and the requirement for obtaining a high spatial resolution profile of a surface of a sample in a relatively short period of time.

It will be evident to those skilled in the art that transverse modes other than the $TEM_{00}$ may be used without departing from either the scope or spirit of the instant invention. The other transverse modes would be excited by beam 24 at an appropriate angle of incidence at optical cavity 130 and by the wavefront of beam 24 having a set of appropriate spatial properties at optical cavity 130. The use of transverse modes other than the $TEM_{00}$ in optical cavity 130 permits operation wherein enhanced transmission through apertures 30 is achieved with differing amplitudes and phases according to a preselected pattern across aperture-array element 142.

It will be further evident to those skilled in the art that an enhanced transmission through wavelength/sub-wavelength apertures 30 that is less than the maximum described herein can also be achieved with a relaxation to varying degrees of one or more of the conditions cited for excitation of a transverse mode of a stable resonant cavity by the beam incident on optical cavity 130 without departing from either the scope or spirit of the instant invention.

A measured reflectivity of the reference optical cavity is used to generate a servo control signal 186R for the control of either $\lambda_1$, if not controlled by servo control signal 154 derived from reflection properties of optical cavity 130, and/or the optical path length $\eta_{1R}d_{1R}$ [see FIG. 2c] of the reference optical cavity so that the resonant condition expressed by Eq. (3) is satisfied. The optical path length $\eta_{1R}d_{1R}$ would be controlled through control of the temperature of reference object 130R. Description of the generation of servo control signal 186R is the same as corresponding portions of the description for the generation of servo control signal 154 through detection of reflected light from the reference cavity to the detector 150R.

Alternatively, servo control signal 186R may be generated from measured values of enhanced transmission of the reference optical cavity. A portion of transmitted reference beam 56 is split off by a non-polarizing beam splitter and detected, preferably by a quantum photon detector, to generate an electronic signal corresponding to 152R (the non-polarizing beam splitter, the detector, and the signal corresponding to 152R are not shown in a figure). The signal corresponding to 152R is transmitted to electronic controller, signal processor, and computer 200 to generate a servo control signal corresponding to 186R.

The transmission $T_{C1}$ of the reference optical cavity, as represented by the magnitude of the signal corresponding to 152R, is given by the formula $$T_{CI} = \frac{T_1 T_2}{[1-(R_1R_2)^{1/2}]^2 + 4(R_1R_2)^{1/2}\sin^2(\delta_1/2)}. \quad (23)$$

Generation of the control signal corresponding to 186R uses the modulation of wavenumber $k_1$ introduced for the generation of servo control signal 154 to modulate $T_{C1}$. The error signal upon which the control signal corresponding to 186R is based comprises the amplitude and phase of the first harmonic at angular frequency $\omega_1$ of the signal corresponding to 152R. The amplitude and phase of the first harmonic is obtained using heterodyne techniques well known to those skilled in the art. The amplitude of the first harmonic is zero when resonant condition expressed by Eq. (3) is satisfied.

A phase shift $\Phi_1$ for transmitted reference beam 56 can be measured and monitored by measuring and monitoring properties of transmitted reference beam 56. From measurement of the $T_{C1}$, the corresponding optical path length $\delta_1$ can be determined using Eq. (23) with independent determinations of corresponding $R_1$ and $R_2$. The independent determinations of corresponding $R_1$ and $R_2$ are preferably based on measured behavior of reflectivity $T_{C1}$ as corresponding $\delta_1$ is varied. Phase shift $\Phi_1$ for transmitted reference beam 56 is then determined from the measured value for corresponding $\delta_1$ using an equating corresponding to Eq. (10).

An advantage of the alternative procedure for generation of the servo control signal control signal 186R is the acquisition of information directly from properties of the enhanced transmission by aperture-array element 142R for the control of either $\lambda_1$, if not controlled by servo control signal 154 derived from reflection properties of the optical cavity 130, and/or the reference optical cavity instead of the acquisition of information from reflective properties of the reference optical cavity as already described.

Figure 2F:
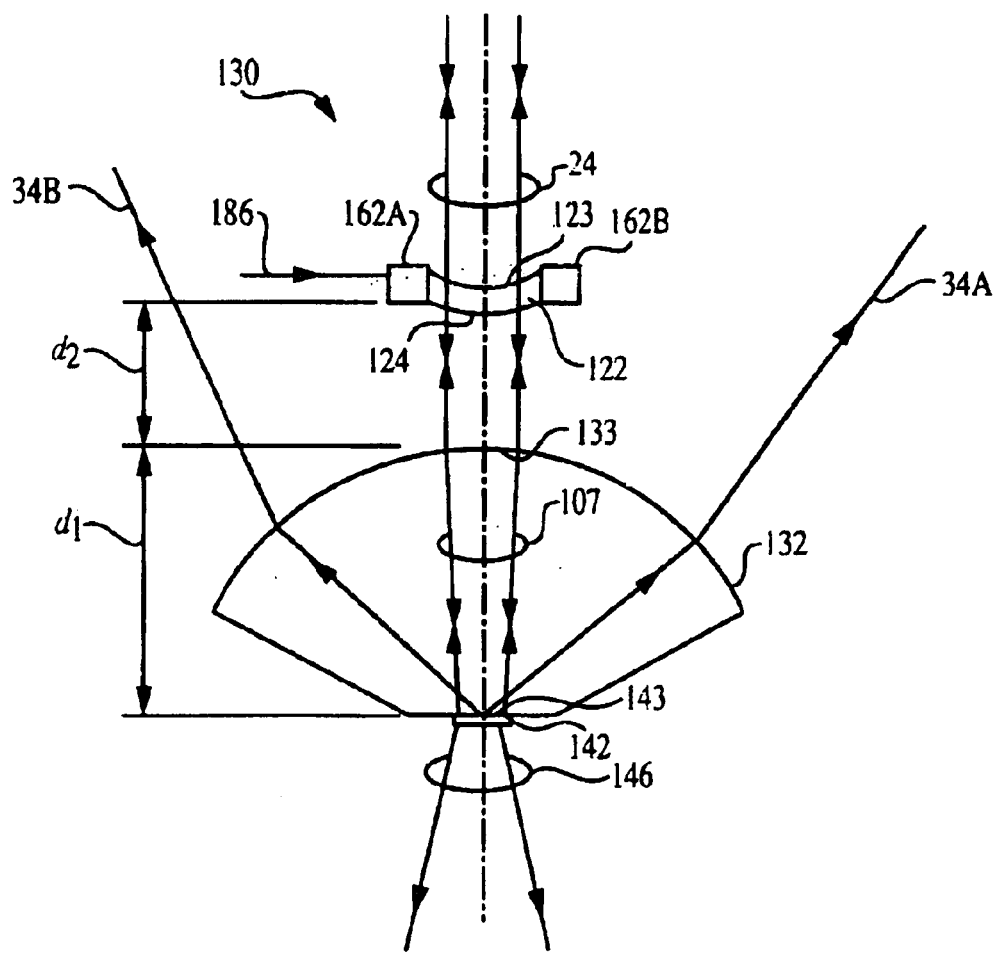
FIG. 2f illustrates, in schematic form, an optical cavity used in a first variant of the first embodiment.

A first variant of the first embodiment is disclosed wherein the control of optical path lengths in optical cavities is achieved by changing the physical lengths of the respective optical cavities. Description of the first variant of the first embodiment is the same as corresponding portions of the first embodiment except with respect to the control of optical path lengths of optical cavities of the first variant of the first embodiment. Optical cavity 130 of the first variant of the first embodiment is shown schematically in FIG. 2f and is defined by surface 124 of lens 122 and interface 143. Surface 124 has a high reflective coating with reflectivity $R_1$ and surface 123 is antireflection coated for wavelength $\lambda_1$. The axial position of lens 122 is controlled by transducers 162A and 162B.

Cavity 130 comprises element 132, having an index of refraction $\eta_1$, and the space between element 132 and lens 122. Surface 133 is antireflection coated for wavelength $\lambda_1$. The space between element 132 and lens 122 is preferably occupied by a gas or a vacuum. However, for certain end-use applications, the space may be partially filled with an optical medium for the purposes of making for example the optical path of optical cavity 130 achromatic.

The radii of curvature of surfaces 124 and 133 are selected so that a condition for existence of a stable transverse mode for the first variant of the first embodiment, corresponding to Eq. (4) for the first embodiment, is satisfied.

The optical path length of the optical cavity 130 of the first variant of the first embodiment that corresponds to the optical path length $\eta_1 d_1$ of cavity 130 of the first embodiment is $$\eta_1 d_1 + d_2. \quad (24)$$

The measured reflectivity of cavity 130 of the first variant of the first embodiment is used to generate a servo control signal 186 for control of optical path length $\eta_1 d_1 + d_2$ so that the resonant condition corresponding to that expressed by Eq. (3) is satisfied. The description of the generation of servo control signal 186 for the first variant of the first embodiment is the same as corresponding portions of the description given for the generation of servo control signal 154 of the first embodiment. Optical path length $\eta_1 d_1 + d_2$ is controlled through the change in $d_2$ by transducers 162A and 162B which are controlled in turn by servo control signal 186.

Figure 2G:
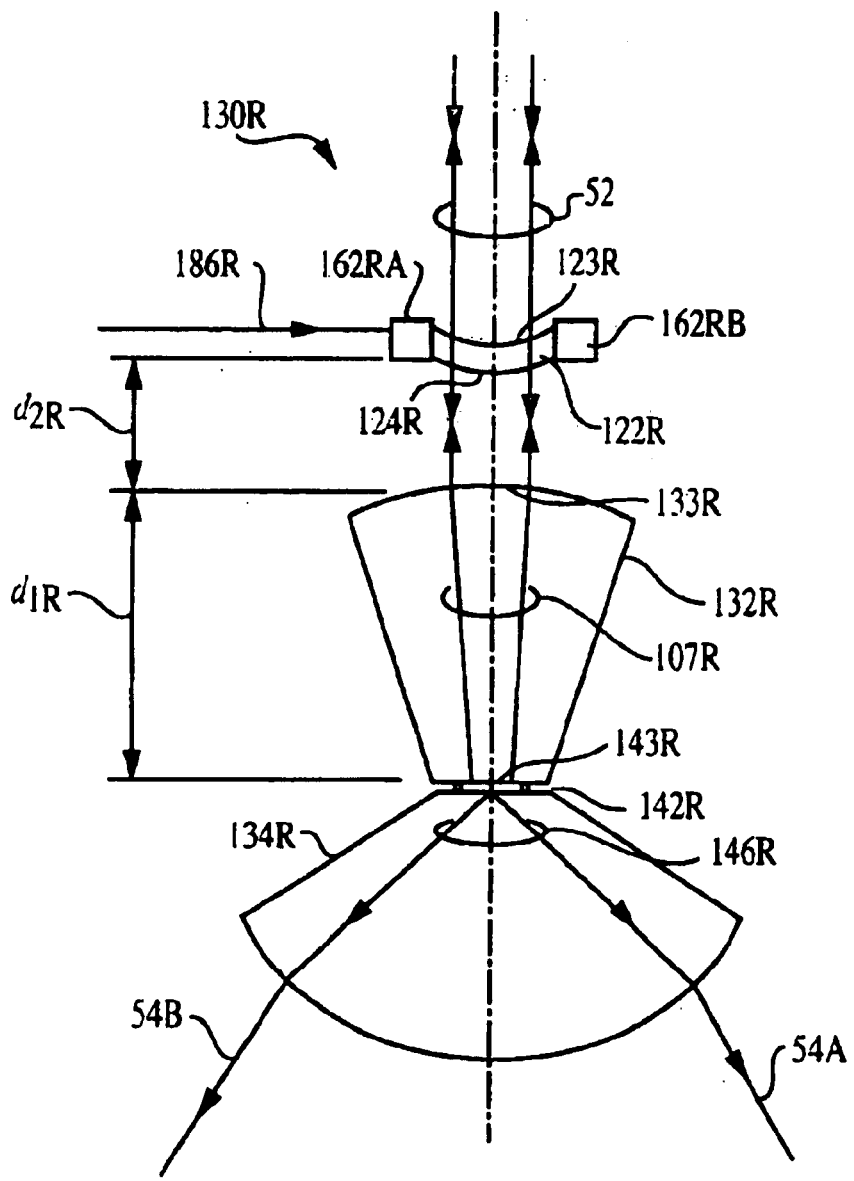
FIG. 2g illustrates, in schematic form, a reference object used in a first variant of the first embodiment.

The reference optical cavity of the first variant of the first embodiment is shown schematically in FIG. 2g and is defined by surface 124R of lens 122R and interface 143R. Surface 124R has a high reflective coating with reflectivity $R_1$ and surfaces 123R and 133R are antireflection coated for wavelength $\lambda_1$. The axial position of lens 122R is controlled by transducers 162RA and 162RB. The remaining description of the control of the reference optical cavity of the first variant of the first embodiment is the same as corresponding portions of the descriptions given for the control of the reference optical cavity of the first embodiment and of optical cavity 130 of the first variant of the first embodiment.

An advantage of the first variant of the first embodiment is that the properties of asociated optical cavities are controlled through changes in the physical lengths of the respective optical cavities so as to meet the respective resonant conditions corresponding to that expressed by Eq. (3) instead of the changing the wavenumber $k_1$ and/or optical paths lengths as in the first embodiment.

The remaining description of the first variant of the first embodiment is the same as corresponding portions of the description given for the first embodiment.

It will be evident to those skilled in the art that spacings $d_2$ and $d_{2R}$ may be modulated by transducers 162A and 162B and transducers 162RA and 162RB, respectively in lieu of a modulation of wavenumber $k_1$ to achieve the amplitude modulation of respective phases $\delta_1$ at angular frequency $\omega_1$ without departing from the scope or spirit of the present invention. A modulation of spacings $d_2$ and $d_{2R}$ has an advantage that wavenumber $k_1$ is not modulated in beams 146 and 146R, the beam resulting from enhanced transmission through aperture-array elements 142 and 142R, respectively.

Figure 3:
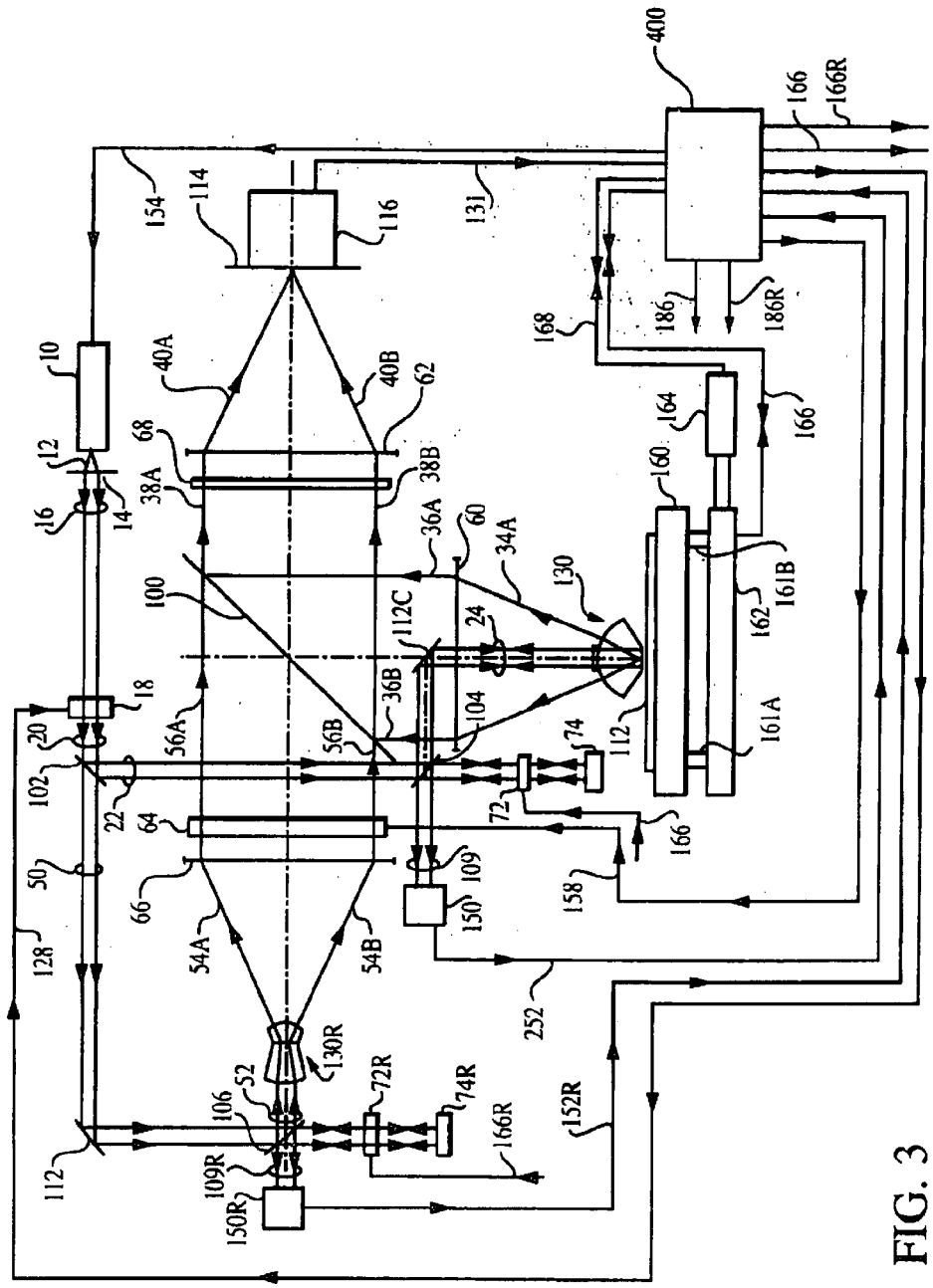
FIG. 3 illustrates, in schematic form, a second embodiment of the present invention.

Referring to the drawings, FIG. 3 illustrates, in schematic form, the second embodiment of the present invention. The second embodiment comprises a scanning interferometric near-field confocal microscope operating in a reflection mode with enhanced transmission of an optical beams through arrays of wavelength or sub-wavelength apertures. The second embodiment further incorporates interferometric techniques to measure and monitor properties of optical cavities whereas the first embodiment and variants thereof use non-interferometric techniques. Interferometric techniques offer advantages in increased signal-to-noise ratios, direct measurements of relative phases between optical beams, and the measurement of the properties of the optical cavities without the requirement of altering either the frequency of an optical beam and/or properties of the optical cavities.

The second embodiment comprises many elements performing like functions as elements of the first embodiment. Elements in FIG. 3 with element numbers the same as element numbers in FIG. 1a are corresponding elements and perform substantially the same functions as the corresponding elements of the first embodiment.

Description of the second embodiment is the same as corresponding portions of the first embodiment except with respect to generation of servo control signals for control of optical path lengths of optical cavity 130 and of the reference optical cavity. For generation of a servo control signal from properties of optical cavity 130, a portion of the beam incident on optical cavity 130 is reflected back to non-polarizing beam splitter 104, after reflection by mirror 112A, where a portion thereof is transmitted by non-polarizing beam splitter 104 as a measurement beam component of beam 109.

A second portion of beam 22 is transmitted by non-polarizing beam splitter 104 as an optical cavity 130 reference beam. The optical cavity 130 reference beam is reflected by mirror 74 as a reflected optical cavity 130 reference beam back to beam splitter 104 where a portion thereof is reflected as a reference beam component of beam 109. The plane of polarization of the measurement and reference beam components of beam 109 is parallel to the plane of FIG. 3.

The reference beam component of beam 109 makes a double pass through phase shifter 72 wherein a double pass phase shift $\chi_2$ is introduced. Phase shift $\chi_2$ is controlled by electronic signal 166 from electroniccontroller, signal processor, and computer 400.

The complex reflectivity coefficient $R_{C2}$ for optical cavity 130 is given to a good approximation for a non-absorbing cavity by the equation $$(R_{C2})^{1/2} = \qquad (25)$$
$$R_3^{1/2} - T_3 \left\{ \frac{R_4}{([1-(R_3R_4)^{1/2}])^2 + 4(R_3R_4)^{1/2}\sin^2(\delta_2/2)} \right\}^{1/2} e^{i(\delta_2+\Phi_2)}$$

where $$\Phi_2 = \tan^{-1}\frac{(R_3R_4)^{1/2}\sin\delta_2}{[1-(R_3R_4)^{1/2}\cos\delta_2]}, \qquad (26)$$

$i=\sqrt{(-1)}$, and reflectivities $R_3$ and $R_4$ and transmission coefficients $T_3$ and $T_4$ of the second embodiment correspond to reflectivities $R_1$ and $R_2$ and transmission coefficients $T_1$ and $T_2$, respectively, of the first embodiment. Phase $\delta_2$ is given by an equation corresponding to Eq. (9) with the wavenumber $k_1$ replaced by $k_2$ of the second embodiment.

Beam 109 is detected by detector 150, preferably by a quantum photon detector, to generate electrical interference signal 152 or signal $s_2$. Signal $s_2$ can be written to a good approximation as $$s_2 = A_2|R_{C2}|^{1/2}\cos(\Phi_2+\chi_2+\zeta_2) \qquad (27)$$

where $\zeta_2$ is a phase that is not a function of either $\Phi_2$ or $\chi_2$, and $A_2$ is a proportionality constant dependent on the magnitude of the amplitude of the reference beam component of beam 109.

Electronic controller, signal processor, and computer 400 determines phase $(\Phi_2+\zeta_2)$ of signal $s_2$ by measuring $s_2$ for a set of values of $\chi_2$. The set of values of $\chi_2$, e.g., 0, $\pi/2$, $(3/2)\pi$, and $\pi$, are controlled by electronic controller, signal processor, and computer 400 through signal 166. A measured value of $s_2$ for a given value of $\chi_2$ from the set of values of $\chi_2$ preferably corresponds to one or more pulses of source 10.

The value of $\Phi_2$ is determined from the measured phase $(\Phi_2+\zeta_2)$ by subtracting a value for $\zeta_2$ independently determined.

An independent determination of $\zeta_2$ can be made by measuring both $(\Phi_2+\zeta_2)$ and amplitude $A_2|R_{C2}|^{1/2}$ of $s_2$ as functions of wavenumber $k_2$. Amplitude $A_2|R_{C2}|^{1/2}$ exhibits a minimum value when $\Phi_2=0$ [see Eq. (25)]. Therefore, the measured value of $(\Phi_2+\zeta_2)$ at the minimum value in $A_2|R_{C2}|^{1/2}$ corresponds to an independent determination for $\zeta_2$.

Electronic controller, signal processor, and computer 400 uses the measured value of $\Phi_2$ as an error signal to generate servo control signal 154. Phase $\Phi_2$ is an antisymmetric function of phase $\delta_2$ about $\Phi_2=0$ [see Eq. (26)]. Servo control signal 154 is transmitted to source 10 to control the wavelength of beam 16 if not controlled by a signal corresponding control signal 186R or the optical path length of optical cavity 130 by control of optical cavity temperature by 186 so that the condition $\Phi_2=0$ is maintained and therefore the resonant condition for cavity 130 is satisfied.

The condition $\Phi_2=0$ will be met only to a certain accuracy by the servo control of the wavelength of beam 16 or the optical path length of optical cavity 130. The effects of the certain accuracy in down stream applications may be compensated in the second embodiment using measured values of phase shift $\Phi_2$.

The description of the generation of the servo control signal 186R for the reference optical cavity of the second embodiment is the same as corresponding portions of the description given for the generation of servo control signal 186 of the second embodiment.

The remaining description of the second embodiment is the same as corresponding portions of the description given for the first embodiment and variant thereof of the present invention.

Advantages of the second embodiment are the generation by interferometric techniques the servo control signals for the optical cavities of the second embodiment leading to increased signal-to-noise ratios, direct measurements of a relative phases between optical beams, and the measurement of the properties of the optical cavities without the requirement of altering either the frequency of the optical beam and/or properties of the optical cavities.

An alternative procedure to that used in the second embodiment for the generation of servo control signals 154 and/or 186, and 186R is based on a modulation of $\chi_2$ and $\chi_{2R}$. Phase $(\Phi_2+\zeta_2)$ is determined using known heterodyne detection techniques or phase sensitive detection techniques for non-pulsed signals such as a digital Hilbert transform phase detector [see "Phase-locked loops: theory, design, and applications" 2nd ed. (McGraw-Hill, New York) 1993, by R.

E. Best], a phase-locked loop [see R. E. Best, ibid.], a sliding window FFT [see *Digital Techniques for Wideband Receivers*, (Artech House, Boston) 1995, by J. Tsui using phase $\chi$ as the reference phase.

It is known for a function sampled uniformly in time that an implementation of a phase sensitive technique based on digital signal processing for acquisition of information on the function yields results based on a Chebyshev polynomial representation of the function [see H. A. Hill and R. T. Stebbins, *Astrophys, J.*, 200, p 484 (1975)]. Consider the example of phase $\chi_2$ being scanned about an offset $\chi_{2,0}$ so that $$\chi_2 = \chi_{2,0} + \Delta\chi_2 \quad (28)$$

where $\Delta\chi_2$ is some function of time t.

The scanning of $\chi_2$ generates components according to the Eqs. (27) and (28) expressed as $$s_2 = A_2|R_{C2}|^{1/2}\cos(\Phi_2+\zeta_2)\cos\Delta\chi - A_2|R_{C2}|^{1/2}\sin(\Phi_2+\zeta_2)\sin\Delta\chi. \quad (29)$$

The amplitude $A_2|R_{C2}|^{1/2}$ and phase $(\Phi_2+\zeta_2)$ are then obtained by way of phase sensitive detection of the coefficients of $\cos\Delta\chi$ and $\sin\Delta\chi$. The phase sensitive detection comprises multiplying $s_2$ by $\cos\Delta\chi$ and integrating $s_2\cos\Delta\chi$ with respect to time and multiplying $s_2$ by $\sin\Delta\chi$ and integrating $s_2\sin\Delta\chi$ with respect to time. For the case of $\Delta\chi$ being a sinusoidal function at an angular frequency $\omega_1$ with an amplitude 1, i.e., $$\Delta\chi_2 = \cos\omega_2 t, \quad (30)$$

and $s_2$ sampled uniformly in time, the coefficients of $\cos\Delta\chi$ and $\sin\Delta\chi$ can be expressed effectively as certain Chebyshev polynomial coefficients of $s_2$.

The certain Chebyshev polynomial coefficients can be expressed using known properties of Chebyshev polynomial as $$A_2|R_{C2}|^{1/2}\cos(\Phi_2+\chi_{2,0}) = \frac{4}{T[1+J_0(2)]}\int_{-T/2}^{T/2} s_2\cos\Delta\chi\, dt \quad (31)$$

$$= \frac{4}{[1+J_0(2)]}\int_{-1}^{1} s_2 \frac{T_1(\Delta\chi_2)}{([1-(\Delta\chi_2)^2])^{1/2}} d\Delta\chi_2,$$

$$A_2|R_{C2}|^{1/2}\sin(\Phi_2+\chi_{2,0}) = -\frac{4}{T[1-J_0(2)]}\int_{-T/2}^{T/2} s_2\sin\Delta\chi\, dt \quad (32)$$

$$= -\frac{4}{[1-J_0(2)]}\int_{-1}^{1} s_2 \frac{V_1(\Delta\chi_2)}{([1-(\Delta\chi_2)^2])^{1/2}} d\Delta\chi_2$$

where $T=2\pi/\omega_2$, $T_1$ and $V_1$ are order 1 Chebyshev polynomials of type I and type II, respectively, and $J_0$ is the order 0 Bessel function of the first kind [see Section 13.3 of *Mathematical Methods for Physicists* by G. Arfken (Academic Press-New York) 1968].

Phase offset $\chi_{2,0}$ can be determined for example by acquiring arrays of amplitudes $[(|S_1|)_n]$ and phases $[(\phi)_n]$ in array $[S_n]$ for object material 112 comprising an isotropic medium, e.g., fused silica, with a surface flat to requisite accuracy, as a function of $\chi_2$ and finding that value of $\chi_2$, $\chi_{2,max}$, for which $[(|S_1|)_n]$ is a maximum. Phase offset $\chi_{2,0}$ will correspond to $-\chi_{2,max}$.

The description of the generation of servo control signal 186R for the alternative procedure is the same as the description given for the determination of servo control signals 154 or 186 for the alternative procedure.

It will be evident to those skilled in the art that there is a variant to the second embodiment that corresponds to the first variant of the first embodiment.

Figure 4:
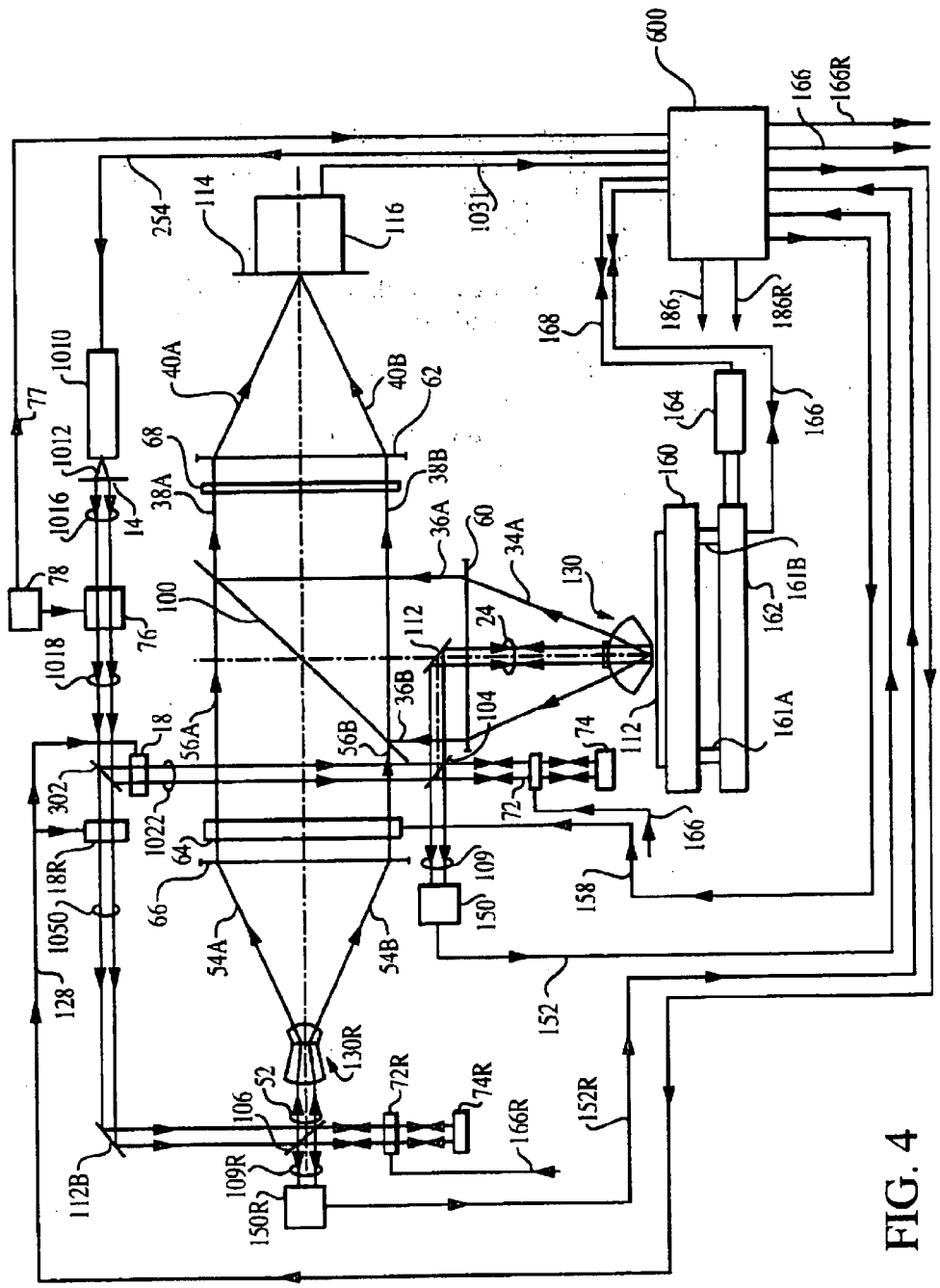
FIG. 4 illustrates, in schematic form, a third embodiment of the present invention.

Referring to the drawings, FIG. 4 illustrates, in schematic form, the third embodiment of the present invention. The third embodiment comprises a pulsed source, generates enhanced transmission of an optical beam through an array of wavelength and/or sub-wavelength apertures, and incorporates interferometric techniques to measure and monitor properties of optical cavities. The pulsed source enables the operation of a near-field interferometric confocal microscope in a continuous scanning mode. Interferometric techniques offer advantages in increased signal-to-noise ratios, direct measurements of a relative phases between optical beams, and the measurement of the properties of optical cavities without the requirement of altering either the frequency of the optical beam and/or properties of the optical cavities.

The third embodiment comprises many elements performing like functions as elements of the second embodiment. Elements in FIG. 4 with element numbers the same as element numbers of certain elements in FIG. 3 are corresponding elements and perform the same functions as the corresponding elements of the second embodiment.

Source 1010 is a pulsed source generated by one of a number of different ways for producing a pulsed source (Silfvast, op. cit.). Source 1010 produces optical beam 1016 that is plane polarized in the plane of FIG. 3. Beam 1016 is incident on a modulator 76 and exits modulator 76 as beam 1018. Modulator 76 is excited by a driver 78. Modulator 76 may for example be an acousto-optical device or a combination of acousto-optical devices with additional optics for modulating a portion of beam 1016. Modulator 76 diffracts by an acousto-optical interaction a portion of beam 1016 as a diffracted beam component of beam 1018. The oscillation frequency of the diffracted beam component of beam 1018 is frequency shifted by an amount $f_3$ with respect to the non-diffracted, non-frequency shifted component of beam 1018 and is linearly polarized orthogonal to the plane of FIG. 4.

The plane of polarization of the non-frequency shifted component of beam 1018 is parallel to the plane of FIG. 4. The diffracted component of beam 1018 is reflected by polarizing beam splitter 302 and then transmitted by phase retardation plate 18 as a measurement beam 1022. The non-diffracted component of beam 1018 is transmitted by polarizing beam splitter 302 and then transmitted by phase retardation plate 18R as a measurement beam 1052. The descriptions of the remaining beams which are pulsed are otherwise the same as the descriptions given for corresponding portions of the description of the second embodiment.

Beam 40 is detected by detector 116, preferably by a quantum photon detector, to generate electrical interference signal 1031 comprising an array of signal values $[S_n]$. Array of signal values $[S_n]$ can be written to a good approximation the same as Eq. (1) wherein $$(S_l)_n = (|S_l|\cos(\omega_3 t + \phi + \chi + \zeta_3))_n, \quad (33)$$

$\omega_3 = 2\pi f_3$ and $\zeta_3$ is a phase that is not a function of either $\phi$, $\chi$, or t.

Electronic controller, signal processor, and computer 600 determines phase $(\phi+\chi+\zeta_3)$ of $(S_l)_n$ by either digital or analog signal processes, preferably digital processes, using time-based phase detection and the phase of driver 78 which is transmitted to electronic controller, signal processor, and computer 600 by signal 77. The array of values of $[(\phi)_n]$ is determined from the measured array of phases $[(\phi+\chi+\zeta_3)_n]$ by subtracting array of phases $[(\chi+\zeta_3)_n]$ independently determined if required in an end-use application.

The array of phases $[(\chi+\zeta_3)_n]$ generally need not be determined other than meet the condition that it not be variable during a period of scanning object material 112. To compare results obtained at different times, it may be necessary to determine any change in the array of phases $[(\chi+\zeta_3)_n]$ that may have occurred during the time between the two different measurement periods. Relative changes in $[(\chi+\zeta_3)_n]$ can be determined for example by acquiring arrays of signal values $[S_n]$ for object material 112 comprising an isotropic medium, e.g., fused silica, with a surface flat to required accuracy.

The coherence time $\tau_c$ for a pulse of beam 1016 is substantially equal to the pulse width $\tau_{p3}$. For the conditions where arrays of signal values $[S_n]$ are measured by detector 116 as an integral over a time interval $\Delta t$, $\Delta t << \tau_c$, and $\tau_c << 1/f_3$, the description of signal values $[S_n]$ is substantially the same as corresponding portions of the description given of arrays of signal values $[S_n]$ of the first embodiment with $\chi$ of the first embodiment given by $$\chi = \omega_3 t, \text{ modulo } 2\pi. \tag{34}$$

Therefore, the description of the third embodiment, when source 1010 is a pulsed source with a pulse coherence time of $\tau_c$, is equivalent to the description of the second embodiment with $\chi$ of the second embodiment replaced by $\omega_3 t$, modulo $2\pi$. The time of the pulses of source 1010 would be selected such $\omega_3 t$ comprise a set of values where each value of the set is an integer number of $2\pi$ plus a value from a finite set of values, e.g., 0, $\pi/2$, $\pi$, and $(3/2)\pi$. The timing of the pulses of source 1010 is controlled by signal 254 generated by electronic controller, signal processor, and computer 600.

An advantage of the third embodiment with respect to the second embodiment is the frequency at which the phase corresponding to $\chi$ of the second embodiment can be changed. The frequency for the change in phase modulo $2\pi$ in the third, a phase equivalent to $\chi$ in the second embodiment, can be as high as of the order of 5 Mhz and remain consistent with the condition $\tau_c << 1/f_3$.

The timing of pulses from source 1010 is coordinated by electronic controller, signal processor, and computer 600 so that for a scan speed v and the spacing of elements 30 and 32 of element 142, information equivalent to arrays of signal values $[S_n]_1$, $[S_n]_2$, $[S_n]_3$, and $[S_n]_4$ of the second embodiment is acquired for the third embodiment. A normalization is performed by electronic controller, signal processor, and computer 600 to compensate for a variation in efficiencies in generation and detection of interference cross terms between complex amplitudes of the near-field return probe beam or the amplitudes of the second background return beam and the reflected reference beam from one element to a second element of an array of signal values. Information required for the normalization can be determined for example by acquiring arrays of signal values $[S_n]$ for object material 112 comprising an isotropic medium, e.g., fused silica, with a surface flat to required accuracy.

Phase shifter 64 may be used in the third embodiment to confirm that the values of phase shifts produced by the combination of the timing of the pulses from source 1010 and modulator 76 are equivalent to a desired set of phase shifts.

It will be evident to those skilled in the art that source 1010 of the third variant of the first embodiment may be replaced with a CW source and the phases of arrays of signal values $[S_n]$ determined using known heterodyne detection techniques or phase sensitive detection techniques for non-pulsed signals such as a digital Hilbert transform phase detector [see "Phase-locked loops: theory, design, and applications" 2nd ed. (McGraw-Hill, New York) 1993, by R. E. Best], a phase-locked loop [see R. E. Best, ibid.], a sliding window FFT [see *Digital Techniques for Wideband Receivers*, (Artech House, Boston) 1995, by J. Tsui], without departing from either the scope or spirit of the present invention.

It will also be evident to those skilled in the art that the third embodiment can be modified so as to obtain two or more simultaneous measurements of arrays of signal values $[S_n]$ according to the teachings of the second variant of the first embodiment of previously mentioned U.S. Provisional Aplication entitled "Scanning Interferometric Near-Field Confocal Microscopy" by Henry A. Hill filed Jul. 27, 2000, without departing from the spirit and scope of the present invention.

Figure 7:
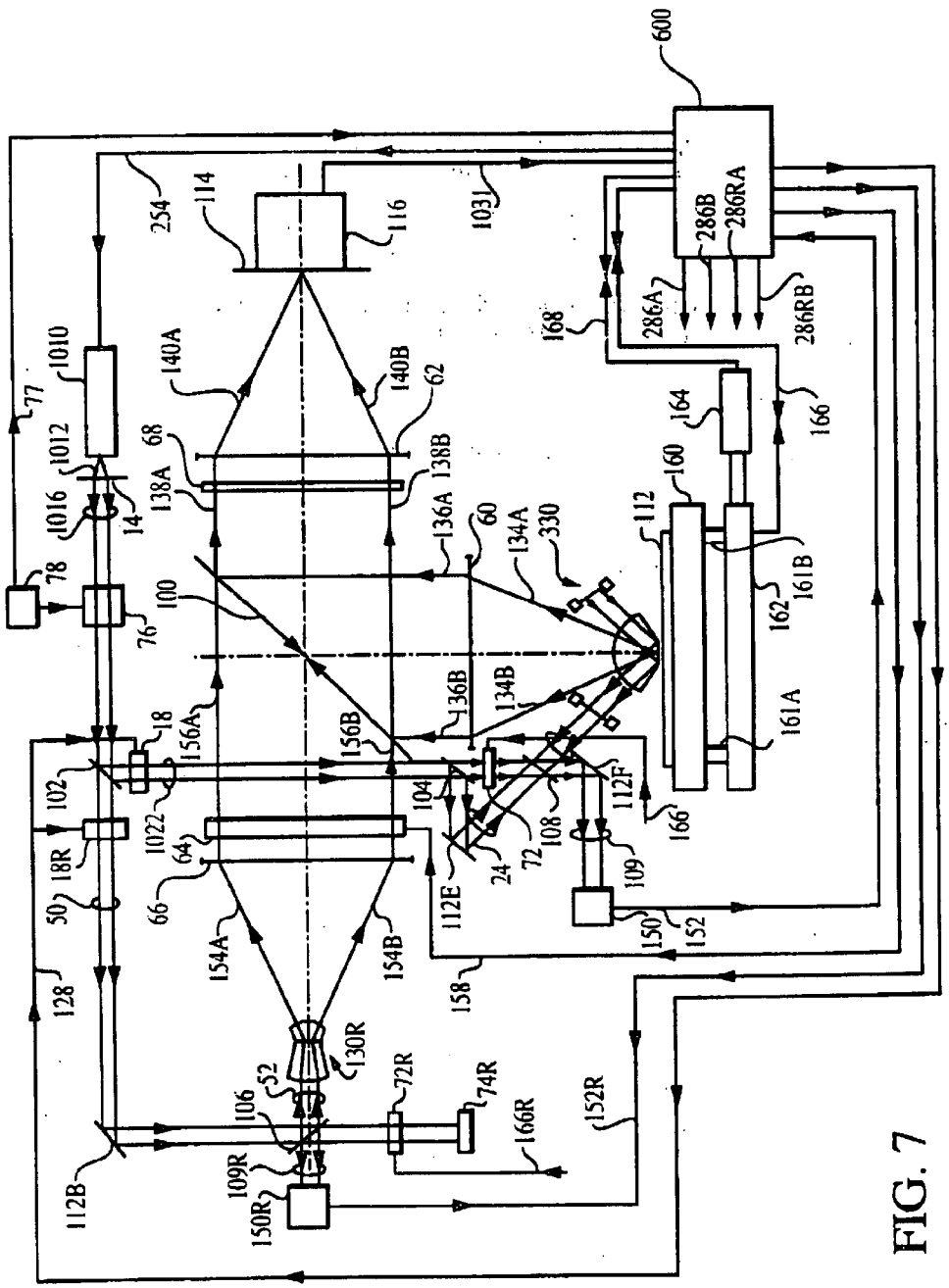
FIG. 7 illustrates, in schematic form, a fifth embodiment of the present invention.

Certain additional reflection and/or scattering properties of object material 112 are obtained by a fourth and fifth embodiments of the present invention wherein near-field probe beams are used that are different from the near-field probe beams used in the first, second, and third embodiments and variants thereof. The primary difference between the fourth and fifth embodiments and the first, second, and third embodiments and variants thereof is the angle of incidence of a measurement beam at the surface of aperture-array element 142. For the first, second, and third embodiments and variants thereof, the angle of incidence is substantially normal to the surface of aperture-array element 142. For the fourth and fifth embodiments, the corresponding angle of incidence is of the order of one radian as shown in FIGS. 5 and 7, respectively.

Figure 5:
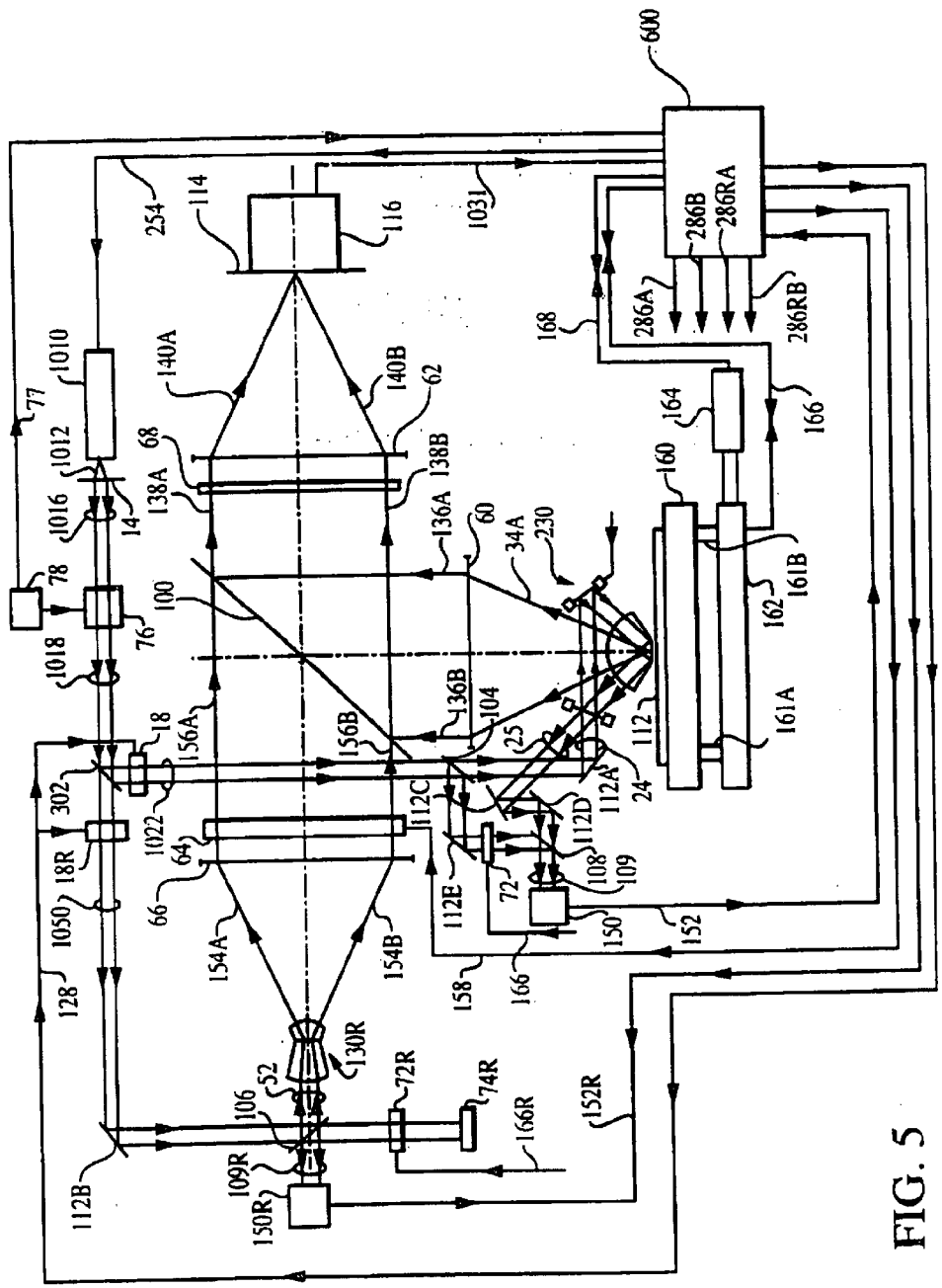
FIG. 5 illustrates, in schematic form, a fourth embodiment of the present invention.

Referring to the drawings, FIG. 5 illustrates, in schematic form, the fourth embodiment of the present invention. The fourth embodiment generates enhanced transmission of an optical beam through an array of wavelength and/or sub-wavelength apertures with a pulsed source. The fourth embodiment further incorporates interferometric techniques to measure and monitor properties of optical cavities. Interferometric techniques offer advantages in increased signal-to-noise ratios, direct measurements of relative phases between optical beams, and the measurement of the properties of the optical cavities without the requirement of altering either the frequency of an optical beam and/or properties of the optical cavities.

The fourth embodiment comprises many elements performing like functions as elements of the third embodiment. Elements in FIG. 5 with element numbers the same as element numbers of certain elements in FIG. 4 are corresponding elements and perform similar functions as the corresponding elements of the third embodiment.

Figure 6A:
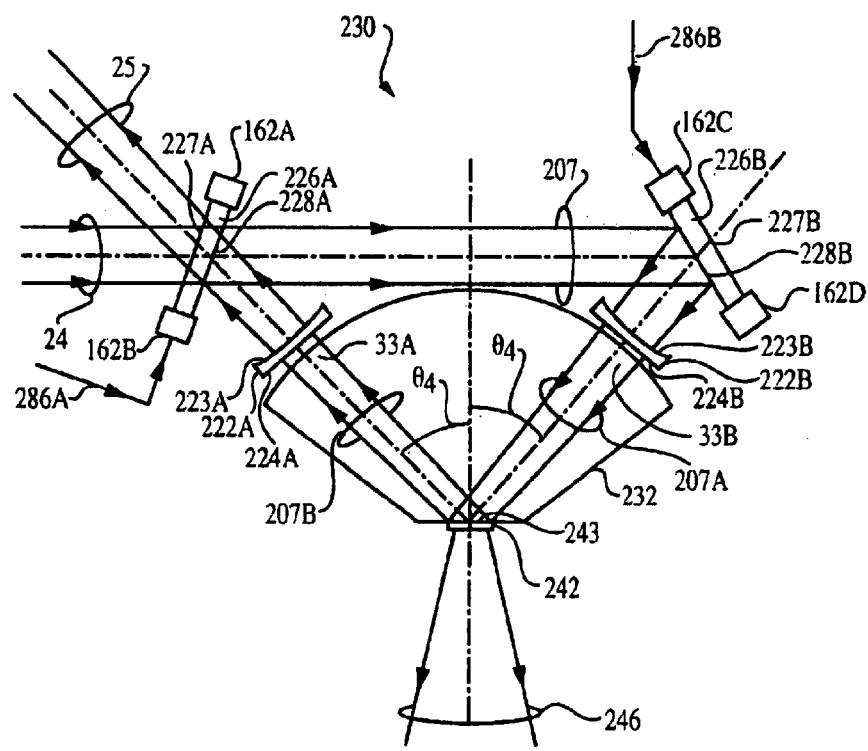
FIG. 6a illustrates, in schematic form, an optical cavity used in the fourth embodiment.

The optical cavity of the fourth embodiment generally indicated at element number 230 in FIG. 5 is illustrated schematically in expanded form in FIG. 6a. Optical cavity 230 is a ring cavity comprising mirrors 226A and 226B, Amici type lens 232, and lenses 222A and 222B. Surfaces 227A, 227B, 223B, 225B, 233B, 233A, 224A, and 223A are antireflection coated for the wavelength of beam 1022. Surfaces 228A and 228B have coatings with a high reflectivity. Interface 243 preferably has a high reflectivity. The description of aperture array element 242 is the same as the corresponding portion of the description given for aperture array element 142 of the first embodiment.

The resonant cavity of optical cavity 230 is defined by surfaces 228A and 228B and interface 243. The general description of properties of optical cavity 230 is the same as corresponding portions of the description given for optical cavity 130 of the first embodiment.

As shown in FIG. 5, beam 1022 is incident on non-polarizing beam splitter 104 and a portion thereof is transmitted and then reflected by mirror 112A as beam 24. Beam 24 is transmitted by surface 227A and incident on surface 228A (see FIG. 6a). The beam incident on surface 228A excites optical cavity 230 with the build up of beam 207 when resonant conditions corresponding to Eq. (3) of the first embodiment are satisfied.

The focal lengths of lenses 222A and 222B are selected so that modes of optical cavity 230 are stable. The focal length of element 226A is selected so that a stable transverse mode of optical cavity 330 is excited the beam incident on surface 228A. The position and angular orientation of mirror 226A is controlled by three transducers 162A and 162B (the third transducer is not shown in FIG. 6a) and the position and angular orientation of mirror 226B is controlled by three transducers 162C and 162D (the third transducer is not shown in FIG. 6a). The transducers represented by transducers 162A and 162B are controlled by servo control signal 286A and the transducers represented by transducers 162C and 162D are controlled by servo control signal 286B.

A portion of beam 24 incident on optical cavity 230 at surface 228A is reflected as beam 25 (see FIG. 6a). As shown in FIG. 5, beam 25 is incident on non-polarizing beam splitter 108, after reflection by mirrors 112C and 112D, and is transmitted as a measurement beam component of beam 109. A second portion of beam 1022 is reflected by non-polarizing beam splitter 104 and a portion thereof is reflected by non-polarizing beam splitter 108, after reflection by mirror 112E and transmitted by phase retardation plate 72, as a reference beam component of beam 109. Beam 109 is a mixed beam with the planes of polarization of the measurement and reference beam components of beam 109 being parallel.

Beam 109 is detected by detector 150, preferably by a quantum photon detector, to generate signal 152. Signal 152 is transmitted to electronic controller, signal processor, and computer 600 and servo control signals 286A and 286B are generated. The description of the generation of servo control signals 286A and 286B is the same as the description of corresponding portions of the description given for generation servo control signals 186 of the third embodiment. For the fourth embodiment, information is obtained to control both the respective positions and orientations of mirrors 226A and 226B by known techniques such as modulating the position or orientation in one plane of one element at a frequency with a small amplitude and detecting an error in position by phase sensitive detection at the frequency. This procedure is repeated for all of the degrees of freedom of mirrors 226A and 226B sequentially or simultaneously using different frequencies for each of the different degrees of freedom.

The description of the generation of the reference cavity of reference object 130R of the fourth embodiment is the same as corresponding portions of the description given for the reference cavity of reference object 130R of the third embodiment.

Figure 6B:
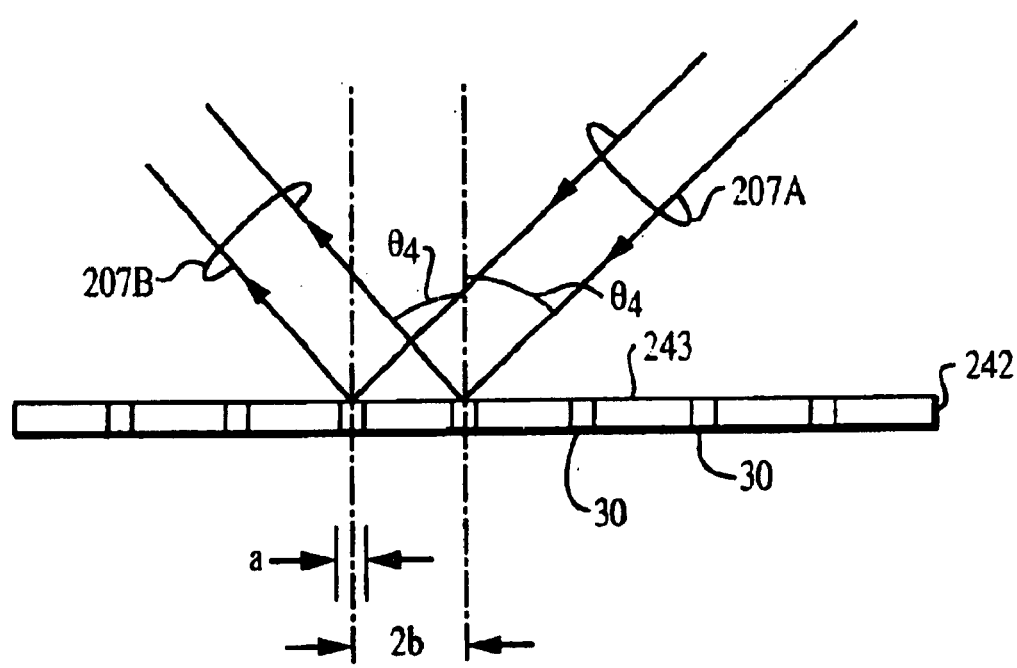
FIG. 6b illustrates, in schematic form, a wavelength or sub-wavelength aperture array used in the fourth embodiment.

The angle of incidence of beam 207A at interface 243 is $\theta_4$ as shown in FIGS. 6a and 6b. As a result of the non-normal angle of incidence, there is a phase shift introduced between near-field probe beams transmitted by adjacent wavelength or sub-wavelength apertures 30. This phase shift $\phi_4$ which is given by the formula $$\phi_4 = 2\eta_4 k_1 b \sin \theta_4 \qquad (35)$$

where $\eta_4$ is the index of refraction of element 232.

The introduction of phase shift $\phi_4$ may be used beneficially used in certain end-use applications such as in differential interferometric confocal near-field microscopy [see, e.g., previously mentioned U.S. Provisional Application entitled "Differential Interferometric Confocal Near-Field Microscopy" by Henry A. Hill].

An advantage of the fourth embodiment is a reduced background because of the design of optical cavity 230.

The remaining description of fourth embodiment is the same as corresponding portions of the description given for the third embodiment.

It will be evident to those skilled in the art that additional optical elements can be introduced into the optical path of beam 207 with an index of refraction such that the resonant conditions for optical cavity 230 are satisfied simultaneously for two different wavelengths without departing from the scope and spirit of the present invention. The resulting achromatic optical cavity can be used with source 1010 being configured to produced optical beam pulses at two different wavelengths. The reconfigured source 1010 can for example comprise two independent pulsed sources with the two beams being combined by a dichroic beam splitter.

Referring to the drawings, FIG. 7 illustrates, in schematic form, the fifth embodiment of the present invention. The fifth embodiment generates enhanced transmission of an optical beam through an array of wavelength and/or sub-wavelength apertures with a pulsed source. The fifth embodiment further incorporates interferometric techniques to measure and monitor properties of optical cavities. Interferometric techniques offer advantages in increased signal-to-noise ratios, direct measurements of relative phases between optical beams, and the measurement of the properties of the optical cavities without the requirement of altering either the frequency of an optical beam and/or properties of the optical cavities.

The fifth embodiment comprises many elements performing like functions as elements of the fourth embodiment. Elements in FIG. 7 with element numbers the same as element numbers of certain elements in FIG. 5 are corresponding elements and perform similar functions as the corresponding elements of the third embodiment.

Figure 8A:
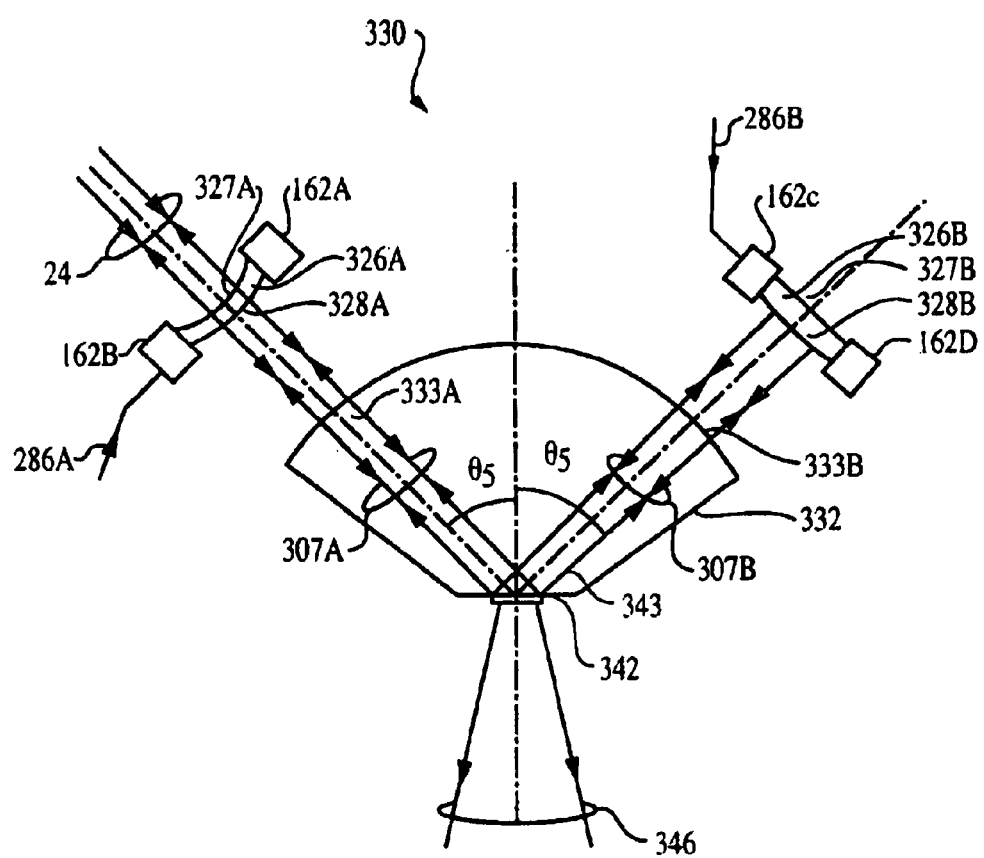
FIG. 8a illustrates, in schematic form, an optical cavity used in the fifth embodiment.

The optical cavity of the fifth embodiment generally indicated at element number 330 in FIG. 5 is illustrated schematically in expanded form in FIG. 8a. Optical cavity 330 is a folded cavity comprising mirrors 326A and 326B, and Amici type lens 332. Surfaces 327A, 327B, 333B, 333A, are antireflection coated for the wavelength of beam 1022. Surfaces 328A and 328B have coatings with a high reflectivity. Interface 343 preferably has a high reflectivity. The description of aperture array element 342 is the same as the corresponding portion of the description given for aperture array element 142 of the first embodiment.

The resonant cavity of optical cavity 330 is defined by surfaces 328A and 328B and interface 343. The general description of properties of optical cavity 330 is the same as corresponding portions of the description given for optical cavity 130 of the first embodiment.

As shown in FIG. 7, beam 1022 is incident on non-polarizing beam splitter 104 and a portion thereof is reflected by mirror 112E as beam 24. Beam 24 is transmitted by surface 327A and incident on surface 328A (see FIG. 8a). The beam incident on surface 328A excites optical cavity 330 with the build up of beam illustrated as elements 307A and 307B when resonant conditions corresponding to Eq. (3) of the first embodiment are satisfied.

The focal lengths of surfaces 328A and 328B are selected so that modes of optical cavity 330 are stable. The focal length of element 326A is selected so that a stable transverse mode of optical cavity 330 is excited the beam incident on surface 328A. The position and angular orientation of element 326A is controlled by three transducers 162A and 162B (the third transducer is not shown in FIG. 8a) and the position and angular orientation of element 226B is controlled by three transducers 162C and 162D (the third transducer is not shown in FIG. 8a). The transducers represented by transducers 162A and 162B are controlled by servo control signal 286A and the transducers represented by transducers 162C and 262D are controlled by servo control signal 286B.

A portion of beam 24 incident on optical cavity 330 at surface 328A is reflected (see FIG. 6a). As shown in FIG. 5, the reflected component of beam 24 is incident on non-polarizing beam splitter 108 and is reflected as a measurement beam component of beam 109 after reflection by mirror 112F. A second portion of beam 1022 is transmitted by non-polarizing beam splitter 104 and a portion thereof first transmitted by phase retardation plate 72 and then transmitted by non-polarizing beam splitter 108 as a reference beam component of beam 109 after reflection by mirror 112F. Beam 109 is a mixed beam with the planes of polarization of the measurement and reference beam components of beam 109 being parallel.

Beam 109 is detected by detector 150, preferably by a quantum photon detector, to generate signal 152. Signal 152 is transmitted to electronic controller, signal processor, and computer 600 and servo control signals 286A and 286B are generated. The description of the generation of servo control signals 286A and 286B is the same as the description of corresponding portions of the description given for generation servo control signals 186 of the third embodiment. For the fifth embodiment, information is obtained to control both the respective positions and orientations of elements 326A and 326B by known techniques such as modulating the position or orientation in one plane of one element at a frequency with a small amplitude and detecting an error in position by phase sensitive detection at the frequency. This procedure is repeated for all of the degrees of freedom of elements 326A and 326B sequentially or simultaneously using different frequencies for each of the different degrees of freedom.

The description of the generation of the reference cavity of reference object 130R of the fourth embodiment is the same as corresponding portions of the description given for the reference cavity of reference object 130R of the third embodiment.

Figure 8B:
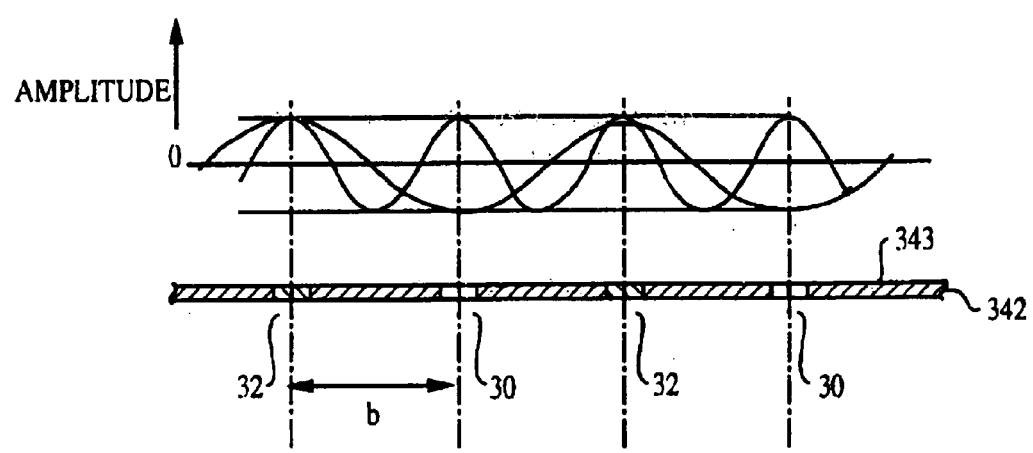
FIG. 8b illustrates, in schematic form, the relationship between a standing wave pattern and a wavelength or sub-wavelength aperture array used in the fifth embodiment.

The angle of incidence of beam 207A at interface 243 is $\theta_5$ as shown in FIG. 8a. As a result of the non-normal angle of incidence, there is a standing wave pattern produced introduced at interface 343. Examples of the amplitudes of standing wave patterns is shown in see FIG. 8b. The anti-nodes of the standing wave patterns can be arranged to coincide with wavelength or sub-wavelength elements 30 and/or 32 by selection of the value of $\theta_5$ and the optical path lengths of optical cavity 330 seen by beams 307A and 307B. The wavelength $\Lambda_5$ of the amplitude of the standing wave pattern is accordingly $$\Lambda_5 = \frac{p\lambda_1}{\eta_5 \sin\theta_5} \quad (36)$$

where $\eta_5$ is the index of refraction of element 332 and p is a non-zero integer.

The registration of anti-nodes with wavelength or sub-wavelength elements 30 and/or 32 by servo control signals 286A and 286B. The procedure described for the generation servo control signals 286A and 286B further comprises modulation of optical path lengths of optical cavity 330 seen by beams 307A and 307B and detecting changes in selected elements of measured signal values $[S_n]$ by phase sensitive detection. The selected elements correspond to the those elements of elements 30 and/or 32 for which its desired to have registration with the anti-nodes.

An advantage of the fifth embodiment is a reduced background because of the design of optical cavity 330.

Another advantage of the fifth embodiment is a potential for improved coupling efficiency of beam 1022 to near-field probe beams.

The remaining description of fifth embodiment is the same as corresponding portions of the description given for the fourth embodiment.

It will be evident to those skilled in the art that additional optical elements can be introduced into the optical path of beams 307A and 307B with an index of refraction such that the resonant conditions for optical cavity 330 are satisfied simultaneously for two different wavelengths without departing from the scope and spirit of the present invention. The resulting achromatic optical cavity can be used with source 1010 being configured to produced optical beam pulses at two different wavelengths. The reconfigured source 1010 can for example comprise two independent pulsed sources with the two beams being combined by a dichroic beam splitter.

Further embodiments of the invention include adapting the systems described above to operate in a transmission mode. Once such embodiment is shown in FIG. 10.

Figure 10:
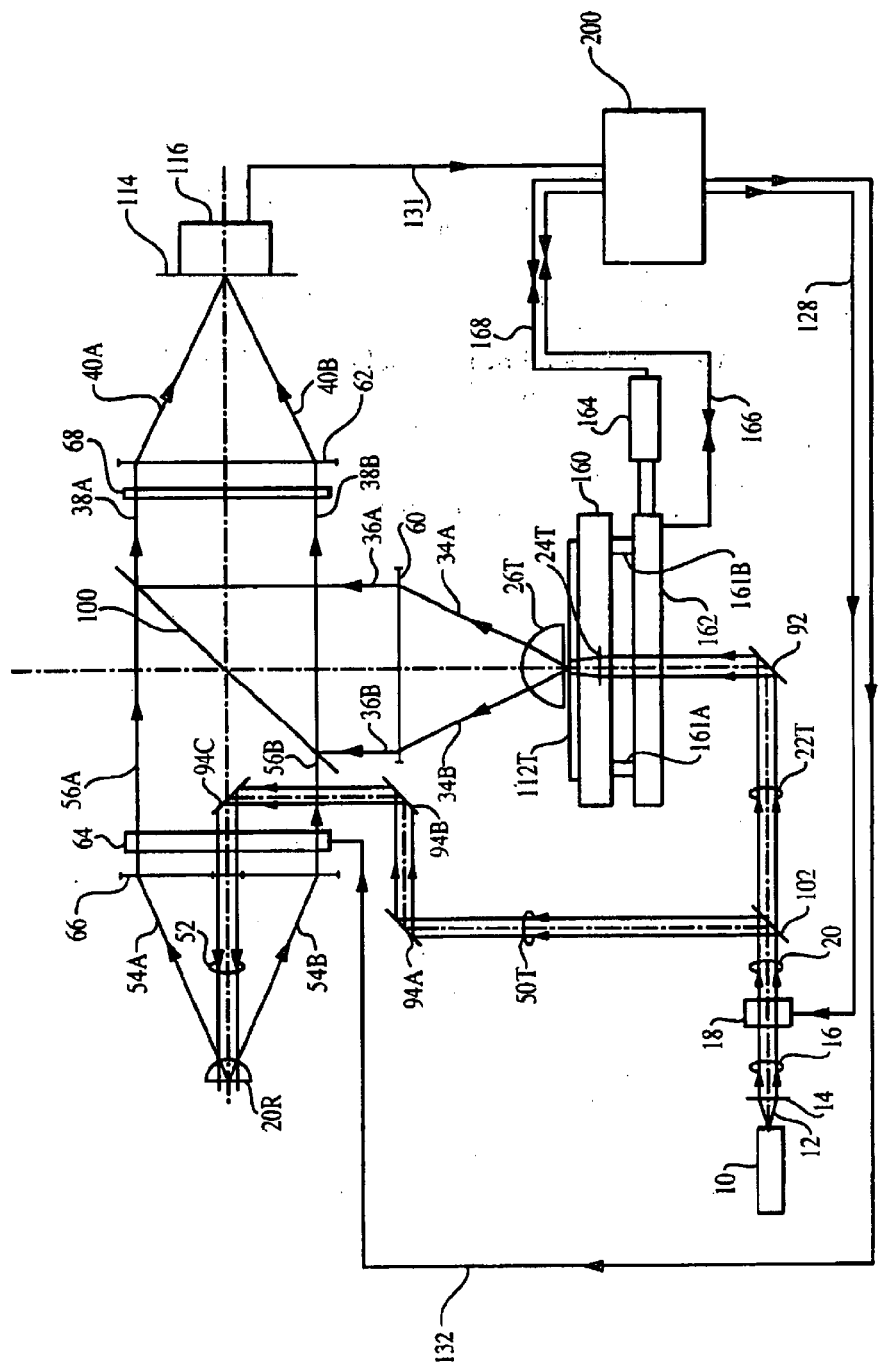
FIG. 10 illustrates, in schematic form, an embodiment of the invention operating in a transmission mode.

Many elements of the embodiment shown in FIG. 10 perform similar functions as elements of the earlier embodiment and are indicated in FIG. 10 with the same element numbers as corresponding elements of the first embodiment shown in FIG. 1a.

Beam 20 is incident on non-polarizing beam splitter 102, and a first portion thereof is transmitted as measurement beam 22T. Measurement beam 22T is next reflected by mirror 92 and then focused to a spot on substrate 112T after reflection by mirror 90. Substrate 112T comprises a transparent substrate at the wavelength of beam 20 and an element 24T including a resonant optical cavity and array of wavelength and/or sub-wavelength apertures. Element 24T corresponds to optical cavity 130 of the first embodiment except that the element does not include scattering sites 32. A portion of measurement beam 22T focused to the spot is transmitted by the apertures of element 24T as an array of near-field probe beams. The description of the apertures is the same as the corresponding portion of the description given for the array of apertures 30 of the first embodiment. The diameter of the spot is large enough span the array of apertures.

Sample 25 to be examined by the array of near-field beams is placed on the flat surface of Amici type lens 26T. The array of near-field probe beams is transmitted by sample 25 as a transmitted beam 34 corresponding to beam 34 of the first embodiment with respect to subsequent processing by the apparatus of the fifth embodiment.

A second portion of beam 20 is reflected by mirror 102 as reference beam 50T, as shown in FIG. 10. Reference beam 50T is transmitted through an aperture in lens 60 as reference beam 52 after reflection by mirrors 94A, 94B, and 94C. Reference beam 52 then contacts reference object 20R which includes an Amici lens and array of reflecting reference elements corresponding to transmissive reference elements 30R in shown in FIG. 2d. The reflecting elements produce return reference beam 54 just as in the embodiment of FIG. 1a. The remaining description is the same as corresponding portions of the description given for the first embodiment.

Notably, in additional embodiments, the reflective reference elements described in reference to FIG. 10 may replace transmissive reference elements of any of the earlier embodiments. Moreover, additional embodiments need not include resonant reference cavity. Furthermore, in yet even further embodiments, the reference object can be uniform reflective object, such as a flat or curved mirror, although such embodiments may couple less of the reference beam to interfere with the near-field signal beams than in the previsously described embodiments.

Other aspects, advantages, and modifications are within the scope of the following claims.

What is claimed is:

1. A multiple source array for illuminating an object, the multiple source array comprising:
   a reflective mask having an array of spatially separated apertures;
   at least one optic positioned relative to the mask to form an optical cavity with the mask; and
   a source providing electromagnetic radiation to the optical cavity to resonantly excite a mode supported by the optical cavity, wherein during operation a portion of the electromagnetic radiation built-up in the cavity leaks through the mask apertures towards the object, and wherein each aperture has a transverse dimension smaller than the vacuum wavelength of the electromagnetic radiation provided by the source.

2. The multiple source array of claim 1, wherein the excited mode has transverse dimensions at the reflective mask that are larger than a transverse dimension of each aperture.

3. The multiple source array of claim 2, wherein the transverse dimensions of the excited mode at the reflective mask are more than 50 times larger than the transverse dimension of each aperture.

4. The multiple source array of claim 1, wherein the apertures are formed by holes in the reflective mask.

5. The multiple source array of claim 1, wherein the apertures are formed by dielectric regions in the reflective mask.

6. The multiple source array of claim 1, wherein each aperture comprises a dielectric region defining a waveguide having transverse dimensions sufficient to support a propagating mode of the electromagnetic radiation, wherein during operation the waveguides couple the electromagnetic energy built-up in the cavity between opposite sides of the mask.

7. The multiple source array of claim 6, wherein the reflective mask further comprises an end mask portion adjacent the object, and wherein each aperture further comprises a secondary aperture formed in the end mask portion and aligned with the corresponding waveguide, wherein each secondary aperture has a transverse dimension smaller than the transverse dimensions of the corresponding waveguide.

8. The multiple source array of claim 7, wherein the transverse dimension of each secondary aperture is smaller than the vacuum wavelength of the electromagnetic radiation provided by the source.

9. The multiple source array of claim 7, wherein the reflective mask comprises a reflective dielectric stack surrounding the waveguides, and wherein the end mask portion comprises a metal layer.

10. The multiple source array of claim 6, wherein each waveguide defines a second optical cavity between the opposite sides of the mask, and wherein the length of each waveguide is selected to be resonant with the corresponding propagating mode of the electromagnetic radiation.

11. The multiple source array of claim 1, wherein the reflective mask comprises a reflective dielectric stack.

12. The multiple source array of claim 11, wherein the reflective dielectric stack is adjacent the optical cavity and the reflective mask further comprises an antireflection coating adjacent the object.

13. The multiple source array of claim 1, further comprising a dielectric material contacting the mask in the optical cavity.

14. The multiple source array of claim 13, wherein the dielectric material is an Amici lens.

15. The multiple source array of claim 13, wherein the optical cavity is a linear optical cavity.

16. The multiple source array of claim 15, wherein the at least one optic comprises one optic and the linear optical cavity is formed by two surfaces, the first surface being defined by the optic and the second surface being defined by the interface between the reflective mask and dielectric material.

17. The multiple source array of claim 16, wherein the dielectric material fills the space between the two surfaces and the first surface is defined by the interface between the optic and the dielectric material.

18. The multiple source array of claim 17, wherein the optic is a lens.

19. The multiple source array of claim 1, wherein the at least one optic comprises two optics and the cavity is a folded cavity formed by three surfaces, the first surface being defined by the first optic, the second surface being defined by the second optic, and the third surface being defined by the interface between the reflective mask and a dielectric material.

20. The multiple source array of claim 1, wherein the optical cavity is a ring cavity.

21. The multiple source array of claim 1, further comprising an active feedback system for maintaining the resonance between the optical cavity and the electromagnetic radiation provided by the source.

22. The multiple source array of claim 21, wherein the active feedback system comprises an electronic controller that causes the source to change the wavelength of the electromagnetic radiation in response to a servo signal derived from a portion of the electromagnetic radiation reflected from the optical cavity.

23. The multiple source array of claim 21, further comprising a dielectric material at least partially filling the optical cavity, and wherein the active feedback system comprises a temperature controller coupled to the dielectric material and an electronic controller that causes the temperature controller to change the temperature of the dielectric material in response to a servo signal derived from a portion of the electromagnetic radiation reflected from the optical cavity.

24. The multiple source array of claim 21, wherein the active feedback system comprises a transducer coupled to one of the optics that form the optical cavity and an electronic controller that causes the transducer to dither the coupled optic in response to a servo signal derived from a portion of the electromagnetic radiation reflected from the optical cavity.

25. The multiple source array of claim 1, wherein the at least one optic positioned relative to the mask forms a stable optical cavity with the mask.

26. A multiple source array for illuminating an object, the multiple source array comprising:
    a reflective mask having an array of spatially separated apertures;

at least one optic positioned relative to the mask to form an optical cavity with the mask; and a source providing electromagnetic radiation to the optical cavity to resonantly excite a mode supported by the optical cavity, wherein during operation a portion of the electromagnetic radiation built-up in the cavity leaks through the mask apertures towards the object, wherein the at least one optic comprises two optics and the cavity is a folded cavity formed by three surfaces, the first surface being defined by the first optic, the second surface being defined by the second optic, and the third surface being defined by the interface between the reflective mask and a dielectric material, and wherein the first and second surfaces define the end surfaces for the folded optical cavity.

27. A multiple source array for illuminating an object, the multiple source array comprising:

a reflective mask having an array of spatially separated apertures;

at least one optic positioned relative to the mask to form an optical cavity with the mask; and a source providing electromagnetic radiation to the optical cavity to resonantly excite a mode supported by the optical cavity, wherein during operation a portion of the electromagnetic radiation built-up in the cavity leaks through the mask apertures towards the object, wherein the optical cavity is a ring cavity, and wherein the at least one optic comprises two optics and the ring cavity is formed by three surfaces, the first surface being defined by the first optic, the second surface being defined by the second optic, and the third surface being defined by the interface between the reflective mask and dielectric material.

28. A microscopy system for imaging an object, the microscopy system comprising:

a multiple source array comprising a reflective mask having an array of spatially separated apertures, at least one optic positioned relative to the mask to form an optical cavity with the mask, and a source providing electromagnetic radiation to the optical cavity to resonantly excite a mode supported by the optical cavity, wherein during operation a portion of the electromagnetic radiation built-up in the cavity leaks through the mask apertures towards the object;

a multi-element photo-detector; and an imaging system positioned to direct a return beam to the multi-element photo-detector, wherein the return beam comprises electromagnetic radiation scattered/reflected by the object back through the apertures in response to the electromagnetic radiation leaked through the apertures towards the object.

29. The microscopy system of claim 28, wherein each aperture has a transverse dimension smaller than the vacuum wavelength of the electromagnetic radiation provided by the source.

30. The microscopy system of claim 28, wherein each aperture has a transverse dimension equal to the vacuum wavelength of the electromagnetic radiation provided by the source.

31. The microscopy system of claim 28, further comprising a pinhole array positioned adjacent the multi-element photo-detector, wherein the multi-element photo-detector comprises multiple detector elements, wherein each pinhole is aligned with a separate set of one or more of the detector elements, and wherein the imaging system produces a conjugate image of each aperture on a corresponding pinhole of the pinhole array.

32. The microscopy system of claim 28, further comprising:

an interferometer which separates the electromagnetic radiation from the source into a measurement beam which is directed to the optical cavity and a reference beam which is directed along a reference beam path and combined with the return beam to interfere at the multi-element photo-detector.

33. A microscopy system for imaging an object, the microscopy system comprising:

a multiple source array comprising a reflective mask having an array of spatially separated apertures, at least one optic positioned relative to the mask to form an optical cavity with the mask, and a source providing electromagnetic radiation to the optical cavity to resonantly excite a mode supported by the optical cavity, wherein during operation a portion of the electromagnetic radiation built-up in the cavity leaks through the mask apertures towards the object;

a multiple detector array comprising an array of spatially separated apertures;

a multi-element photo-detector; and an imaging system positioned to image a signal beam to the multi-element photo-detector, wherein the signal beam comprises electromagnetic radiation transmitted by the object through the apertures of the multiple detector array in response to the electromagnetic radiation leaked through the apertures of the multiple source array towards the object.

34. A microscopy system of claim 33, wherein the apertures of the source array are aligned with the apertures of the detector array.

35. The microscopy system of claim 33, further comprising a pinhole array positioned adjacent the multiple-element photo-detector, wherein the multiple-element photo-detector comprises multiple detector elements, wherein each pinhole is aligned with a separate set of one or more of the detector elements, and wherein the imaging system produces a conjugate image of each aperture of the multiple detector array on a corresponding pinhole of the pinhole array.

36. The microscopy system of claim 33, further comprising:

an interferometer which separates the electromagnetic radiation from the source into a measurement beam which is directed to the optical cavity and a reference beam which is directed along a reference beam path and combined with the signal beam to interfere at the multi-element photo-detector.

37. A method for illuminating an object, the method comprising:

resonantly exciting a mode of a stable optical cavity with electromagnetic radiation from a source; and coupling electromagnetic radiation out of the optical cavity towards the object through an array of apertures in one of multiple optics that define the cavity, wherein transverse dimensions of the excited mode are larger than a transverse dimension of each aperture, and wherein each aperture has a transverse dimension smaller than the vacuum wavelength of the electromagnetic radiation provided by the source.

38. The method of claim 37, wherein the transverse dimensions of the excited mode are more than 50 times larger than the transverse dimensions of each aperture.

39. The method of claim 37, further comprising:

imaging electromagnetic radiation produced by the object in response to the electromagnetic radiation coupled out of the optical cavity towards the object to a multi-element photo-detector.

40. The method of claim 39, further comprising:

interfering the imaged electromagnetic radiation with reference electromagnetic radiation at the multi-element photo-detector, wherein the reference electromagnetic radiation and the electromagnetic radiation coupled out of the optical cavity are derived from a common source.

41. A microscopy method comprising:

resonantly exciting a mode of a stable optical cavity with electromagnetic radiation from a source;

coupling electromagnetic radiation out of the optical cavity towards an object through an array of apertures in one of multiple optics that define the cavity, wherein transverse dimensions of the excited mode are larger than a transverse dimension of each aperture; and imaging electromagnetic radiation produced by the object in response to the electromagnetic radiation coupled out of the optical cavity towards the object to a multi-element photo-detector, wherein the imaged electromagnetic radiation produced by the object passes back through the array of apertures before being imaged to the multi-element photo-detector.

42. The method of claim 41, further comprising:

positioning a pinhole array adjacent the multi-element photo-detector, wherein each pinhole is aligned with a separate set of one or more detector elements of the multi-element photo-detector, and wherein the imaged radiation produces a conjugate image of each aperture on a corresponding pinhole of the pinhole array.

43. A microscopy method comprising:

resonantly exciting a mode of a stable optical cavity with electromagnetic radiation from a source;

coupling electromagnetic radiation out of the optical cavity towards an object through an array of apertures in one of multiple optics that define the cavity, wherein transverse dimensions of the excited mode are larger than a transverse dimension of each aperture; and imaging electromagnetic radiation produced by the object in response to the electromagnetic radiation coupled out of the optical cavity towards the object to a multi-element photo-detector, wherein the electromagnetic radiation produced by the object passes through a second array of apertures before being imaged to the multi-element photo-detector.

44. The method of claim 43, further comprising:

positioning a pinhole array adjacent the multi-element photo-detector, wherein each pinhole is aligned with a separate set of one or more detector elements of the multi-element photo-detector, and wherein the imaged radiation produces a conjugate image of each aperture of the second array of apertures on a corresponding pinhole of the pinhole array.

45. A microscopy system for imaging an object, the microscopy system comprising:

a multiple source array comprising
  a reflective mask having an array of spatially separated apertures,
  at least one optic positioned relative to the mask to form an optical cavity with the mask, and
  a source providing electromagnetic radiation to the optical cavity to resonantly excite a mode supported by the optical cavity, wherein during operation a portion of the electromagnetic radiation built-up in the cavity leaks through the mask apertures towards the object;

a multi-element photo-detector;

an imaging system positioned to direct a return beam to the multi-element photo-detector, wherein the return beam comprises electromagnetic radiation leaked to the object and scattered/reflected back through the apertures; and an interferometer which separates the electromagnetic radiation from the source into a measurement beam which is directed to the optical cavity and a reference beam which is directed along a reference beam path and combined with the return beam to interfere at the multi-element photo-detector.

46. A microscopy system for imaging an object, the microscopy system comprising:

a multiple source array comprising
  a reflective mask having an array of spatially separated apertures,
  at least one optic positioned relative to the mask to form an optical cavity with the mask, and
  a source providing electromagnetic radiation to the optical cavity to resonantly excite a mode supported by the optical cavity, wherein during operation a portion of the electromagnetic radiation built-up in the cavity leaks through the mask apertures towards the object;

a multiple detector array comprising an array of spatially separated apertures;

a multi-element photo-detector;

an imaging system positioned to direct a signal beam to the multi-element photo-detector, wherein the signal beam comprises electromagnetic radiation leaked to the object and transmitted by the object through the apertures of the multiple detector array; and an interferometer which separates the electromagnetic radiation from the source into a measurement beam which is directed to the optical cavity and a reference beam which is directed along a reference beam path and combined with the signal beam to interfere at the multi-element photo-detector.

* * * * *